United States Patent
Noda et al.

(10) Patent No.: US 8,440,948 B2
(45) Date of Patent: May 14, 2013

(54) HEATING COOKER

(75) Inventors: Tomimitsu Noda, Tokyo (JP); Kazuhiro Furuta, Tokyo (JP); Masaji Yonekura, Tokyo (JP); Yoshio Ikeda, Tokyo (JP)

(73) Assignees: Kabushiki Kaisha Toshiba, Tokyo (JP); Toshiba Ha Products Co., Ltd., Osaka (JP); Toshiba Consumer Marketing Corporation, Tokyo (JP)

( * ) Notice: Subject to any disclaimer, the term of this patent is extended or adjusted under 35 U.S.C. 154(b) by 1448 days.

(21) Appl. No.: 12/065,372

(22) PCT Filed: Jul. 25, 2006

(86) PCT No.: PCT/JP2006/314654
§ 371 (c)(1),
(2), (4) Date: Feb. 29, 2008

(87) PCT Pub. No.: WO2007/026482
PCT Pub. Date: Mar. 8, 2007

(65) Prior Publication Data
US 2009/0188915 A1    Jul. 30, 2009

(30) Foreign Application Priority Data

Aug. 30, 2005 (JP) ................... 2005-249214
Apr. 25, 2006 (JP) ................... 2006-120416

(51) Int. Cl.
*H05B 6/64* (2006.01)

(52) U.S. Cl.
USPC ........... 219/757; 219/763; 126/21 A; 426/107

(58) Field of Classification Search .................. 219/757, 219/679, 681, 682, 684, 728, 400, 724, 705, 219/722, 763, 506, 492, 683; 126/21 A; 426/107
See application file for complete search history.

(56) References Cited

U.S. PATENT DOCUMENTS

| 4,338,911 A * | 7/1982 | Smith ................. 126/21 A |
| 5,177,333 A | 1/1993 | Ogasawara |

(Continued)

FOREIGN PATENT DOCUMENTS

| JP | S56-170900 | 12/1981 |
| JP | U-S57-77804 | 5/1982 |

(Continued)

OTHER PUBLICATIONS

JP Office Action issued in Application No. 2006-173645 mailed Sep. 30, 2008.

(Continued)

*Primary Examiner* — Quang Van
(74) *Attorney, Agent, or Firm* — DLA Piper LLP (US)

(57) ABSTRACT

A heating cooker includes a cooking chamber accommodating an object to be cooked, a hot air generator and a blower. Hot air generated by the generator impinges as a high-speed impinging jet on the object from a nozzle hole located in a ceiling plate. The hot air having impinged on the object is drawn our through hot-air suction openings located in lower parts of right and left sidewalls of the chamber by the blower. A shelf plate is located in the chamber so that the object is placed on it. The shelf plate has openings on right and left sides. Hot air is caused to impinge on the object through the nozzle hole. The shelf has a convex portion formed on a face on which the object is to be placed which supports the object from below.

7 Claims, 23 Drawing Sheets

U.S. PATENT DOCUMENTS

| | | | | |
|---|---|---|---|---|
| 5,928,541 | A | * | 7/1999 | Tsukamoto et al. .......... 219/400 |
| 7,435,931 | B1 | * | 10/2008 | McKee et al. ................. 219/683 |
| 2003/0015518 | A1 | | 1/2003 | Baker et al. |
| 2003/0024925 | A1 | | 2/2003 | Graves et al. |
| 2004/0232140 | A1 | | 11/2004 | Kanzaki |

FOREIGN PATENT DOCUMENTS

| | | | |
|---|---|---|---|
| JP | U-S58-129402 | | 9/1983 |
| JP | 59-231331 | | 12/1984 |
| JP | 61-125524 | | 6/1986 |
| JP | 61-143623 | A | 7/1986 |
| JP | 61-282725 | | 12/1986 |
| JP | 63-137538 | | 9/1988 |
| JP | 4-116318 | A | 4/1992 |
| JP | 04-292894 | | 10/1992 |
| JP | 5-33938 | A | 2/1993 |
| JP | 05-226072 | | 9/1993 |
| JP | 2004-325004 | | 1/1994 |
| JP | A-H06-020773 | | 1/1994 |
| JP | A-H06-510849 | | 12/1994 |
| JP | A-H07-108234 | | 4/1995 |
| JP | 7-119974 | A | 5/1995 |
| JP | 09-014675 | | 1/1997 |
| JP | 9-126464 | A | 5/1997 |
| JP | A-H11-190523 | | 7/1999 |
| JP | 2000-257864 | | 9/2000 |
| JP | 2001-311518 | A | 11/2001 |
| JP | 2002-071140 | | 3/2002 |
| JP | 2002-511561 | A | 4/2002 |
| JP | 2002125573 | A * | 5/2002 |
| JP | 2002-257347 | | 9/2002 |
| JP | 2002-286229 | A | 10/2002 |
| JP | 2002-319483 | | 10/2002 |
| JP | A-2002-345640 | | 12/2002 |
| JP | 2003-148742 | | 5/2003 |
| JP | 2003-297526 | | 10/2003 |
| JP | 2004-309060 | | 11/2004 |
| JP | 2005-155962 | A | 6/2005 |
| JP | 2006-136152 | | 5/2006 |

OTHER PUBLICATIONS

Translation of JP Office Action issued in Application No. 2006-173645 mailed Sep. 30, 2008.
English Language Abstract for JP Publication No. 2002-319483.
English machine translation for JP Publication No. 2002-319483.
Patent Language Abstract for JP Publication No. 2002-071140.
English machine translation for JP Publication No. 2002-071140.
English Language Abstract for JP Publication No. 61-282725.
English Language Abstract for JP Publication No. 2003-148742.
English machine translation for JP Publication No. 2003-148742.
English Language Abstract for JP Publication No. JP-U-S63-137538.
English Language Abstract for JP Publication No. 2006-136152.
English machine translation for JP Publication No. 2006-136152.
Office Action issued in corresponding Taiwanese patent application No. 96122577 on Nov. 19, 2009.
English Translation of Office Action issued in corresponding Taiwanese patent application No. 96122577 on Nov. 19, 2009.
Interrogation issued in the prosecution of JP 2006-173645 issued on Sep. 14, 2010.
English Translation of Interrogation issued in the prosecution of JP 2006-173645 issued on Sep. 14, 2010.
English Language Abstract of JP 2003-297526 published Oct. 17, 2003.
English Language Abstract of JP 61-125524 published Jun. 14, 1986.
English Language Translation of JP 2003-297526 published Oct. 17, 2003.
U.S. Appl. No. 11/764,821.
Machine English Language Translation of JP 2002-345640 published Dec. 3, 2002.
English Abstract of JP 2006-136152 published May 25, 2006.
Office Action issued in JP Appl 2005-24914 on Nov. 9, 2010.
English Translation of Office Action issued in JP Appl 2005-24914 on Nov. 9, 2010.
Corresponding PCT (WO99/52328) English abstract for JP-2002-511561 A.
English abstract of JP-2005-155962 A.
English abstract of JP-2001-311518 A.
English abstract of JP-61-143623 A.
English abstract of JP-5-33938 A.
English abstract of JP-7-119974 A.
English abstract of JP-2002-286229 A.
English translation for JP-U-S57-77804.
English translation for JP-U-S58-129402.
English abstract of A JP-9-126464.
English abstract of JP-4-116318 A.
Corresponding PCT (WO93/06699) English abstract of JP-A-H06-510849.
English abstract of JP-A-H07-108234.
International Search Report for PCT/JP2006/314654.
Office Action issued in corresponding Korean Patent Application No. 2008-7005520 on Feb. 1, 2010.
English translation of Office Action issued in corresponding Korean Patent Application No. 2008-7005520 on Feb. 1, 2010.
English Language Abstract of JP A-H11-190523 published on Jul. 13, 1999.
English Language Machine Translation of JP A-H11-190523 published on Jul. 13, 1999.
Machine English language translation of JP 2002-511561A, published Apr. 16, 2002.
Machine English language translation of JP 2005-155962A, published Jun. 16, 2005.
Machine English language translation of JP 2001-311518A, published Nov. 9, 2001.
Machine English language translation of JP 05-033938A, published Feb. 9, 1993.
Machine English language translation of JP 07-119974A, published May 12, 1995.
Machine English language translation of JP 2002-286229A, published Oct. 3, 2002.
Machine English language translation of JP 09-126464A, published May 16, 1997.
Machine English language translation of JP 07-108234A, published Apr. 25, 1995.
English language Abstract of JP 2002-511561A, published Apr. 16, 2002.
Office Action issued in JP 2006-120416 on Jul. 26, 2011.
English Language Translation of Office Action issued in JP 2006-120416 on Jul. 26, 2011.
English Language Abstract of JP 2002-257347 published Sep. 11, 2002.
English Language Translation of JP 2002-257347 published Sep. 11, 2002.
English Language Abstract of JP 09-014675 published Jan. 17, 1997.
English Language Translation of JP 09-014675 published Jan. 17, 1997.
English Language Abstract of JP 2000-257864 published Sep. 22, 2000.
English Language Translation of JP 2000-257864 published Sep. 22, 2000.
Interrogation issued in JP 2009-11998 on Nov. 16, 2010.
English Translation of Interrogation issued in JP 2009-11998 on Nov. 16, 2010.
English Abstract of JP 59-231331 published Dec. 26, 1984.
English Abstract of JP 2002-345640 published Dec. 26, 1984.
English Translation of JP 2002-345640 published Dec. 26, 1984.
English Abstract of JP H06-020773 published Jan. 28, 1994.
English Translation of JP H06-020773 published Jan. 28, 1994.
English Abstract of JP 2004-325004 published Jan. 18, 1994.
English Translation of JP 2004-325004 published Jan. 18, 1994.
English Abstract of JP 2004-309060 published Nov. 4, 2004.
English Translation of JP 2004-309060 published Nov. 4, 2004.
English Abstract of JP 04-292894 published Oct. 16, 1992.
English Abstract of JP 05-226072 published Sep. 3, 1993.

* cited by examiner

HEATING COOKER

FIELD

The present invention relates to a heating cooker to which is applied an impinging jet heat transfer technique in which heat is transferred by an impinging high-speed hot air blast on an object to be cooked.

BACKGROUND

Art

Cooking an object from a frozen condition has conventionally been carried out by heating the inside of the object by microwave heating and by simultaneously applying radiant heat from a heater or circulating hot air generated by a heater disposed at the rear of a cooking chamber. A fan may be used so that the temperature of the air in the cooking chamber is increased.

Convenience stores etc. serve customers by cooking purchased frozen food for a short time of 60 to 90 seconds. Since it is difficult to complete the aforesaid conventional cooking manner in such a short time, preheating is carried out to keep the temperature in the cooking chamber high. However, it is unfavorable to normally keep the temperature in the cooking chamber high from the view point of heat efficiency.

A technique for cooking frozen food in a short time has recently been developed by application of an impinging jet heat transfer technique in which heat is transferred to food to be cooked by impinging jet flow of high-speed hot air on the food. For example, Patent Document 1 proposes a quick cooking oven to which the impinging jet heat transfer technique is applied. In the disclosed oven, hot air blown out of an upper part of the cooking chamber is caused to impinge on an object to be cooked so that the object is heated by thermal energy of the hot air, and the hot air is returned from a lower part of the cooking chamber into a heat source thereby to be recirculated. Heat is also applied to the object by microwave heating in parallel with the hot air impingement so that the inside of the object is heated, whereby quick cooking is carried out.

However, heat loss is large since the aforesaid oven has a complicated interior structure of the cooking chamber and a hot air circulation path is long. Furthermore, cleaning is difficult to carry out when a fluid matter such as water content oozing from the object or small pieces of the object enters the hot air circulation path.

Furthermore, Patent Document 2 proposes an impinging jet heat transfer heating processor in which components in a cooking chamber are rendered detachable so that cleaning can easily be carried out. However, detaching the components is troublesome and a hot air source is disposed at the rear of the cooking chamber so that hot air is supplied through both upper and lower surfaces, whereupon the temperature becomes higher at a location near to the heat source such that cooking becomes uneven. Furthermore, since hot air suction openings through which hot air in the cooking chamber is drawn out are provided in a rear surface, hot air not contributing to cooking is drawn out through the openings, reducing the hot air drawing efficiency.

Patent document 1: JP-A-H06-510849
Patent Document 2: JP-A-H07-108234

SUMMARY

The present invention was made to overcome the above-described problems of the conventional technique and an object thereof is to provide a heating cooker which can rapidly apply heat to an object to be cooked by application of the impinging jet heat transfer technique and in which the interior of the cooking chamber can easily be cleaned and heat loss is small.

A heating cooker of the present invention comprises a box-shaped cooking chamber adapted to accommodate an object to be cooked and a hot air generator having a heater-type heat source and a blower. A shelf plate comprised of a heat-resistant material is provided in the cooking chamber on which the object is to be placed. The shelf plate has openings in both right and left sides thereof. Hot air generated by the hot air generator impinges on the object placed on the shelf plate as a high-speed jet through a nozzle hole provided in the ceiling of the cooking chamber so that heat is applied to the object. The hot air which has been impinged is drawn out through hot-air suction openings provided in lower parts of right and left side walls of the cooking chamber by the blower, whereby the hot air is returned to the hot air generator to be recirculated. The shelf plate has a convex portion formed on a face on which the object is to be placed which is adapted to support the object from below.

The heater-type heat source constituting the hot air generator includes a plurality of U-shaped heaters each of which has radiating fins therearound. The U-shaped heaters are disposed at equal intervals in a direction of flow of air-blown by the blower and locations of each odd-numbered heater and even-numbered heater are displaced by an outer diameter of the radiating fin in a direction perpendicular to the direction of the air flow so that the heaters are inclined at such an angle that peripheries of the radiating fins of the heaters adjacent to each other are seen as overlapped.

The heating cooker of the present invention can carry out quick cooking at a high heat transfer rate since hot air is converted to a high-speed jet flow, which is caused to impinge on the object to be cooked, whereby heat is applied to the object. Furthermore, the cooking chamber is structured so that hot air is supplied into the cooking chamber through the nozzle holes provided in the ceiling plate and drawn out through the lower parts of the right and left sidewalls. Since the bottom of the cooking chamber is provided with no components such as nozzle holes or suction openings, the interior of the cooking chamber can easily be cleaned.

DETAILED DESCRIPTION

First Embodiment

Figure 1:
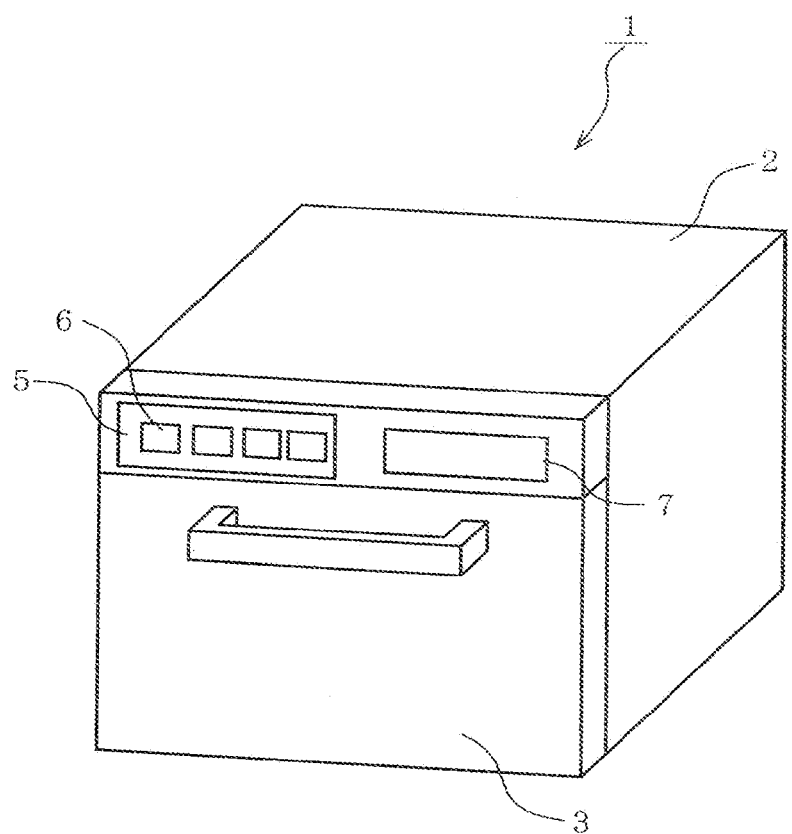
FIG. 1 is a perspective view of a heating cooker of a first embodiment in accordance with the present invention.

The invention will be described in more detail with reference to the accompanying drawings. FIGS. 1 to 20 illustrate a first embodiment of the heating cooker in accordance with the present invention. FIG. 1 is a perspective view showing an appearance of the heating cooker 1. The heating cooker 1 includes a cabinet 2 serving as an outer shell. A door 3 is mounted on a front so as to be caused to pivot forward thereby to be opened. An upper part of the door 3 serves as an operation panel 5. The panel 5 includes operation switches 6 setting cooking conditions and a display 7 displaying set contents, cooking course and the like.

Figure 2:
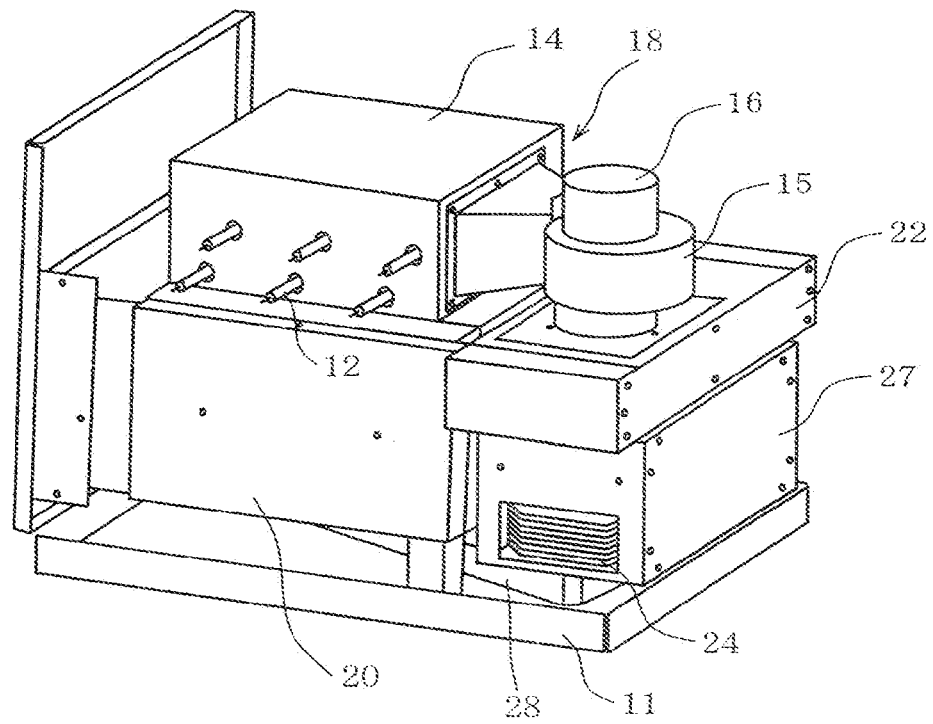
FIG. 2 is a perspective view of the cooking chamber as viewed from obliquely below at the rear with a cabinet and door being eliminated.
Figure 3:
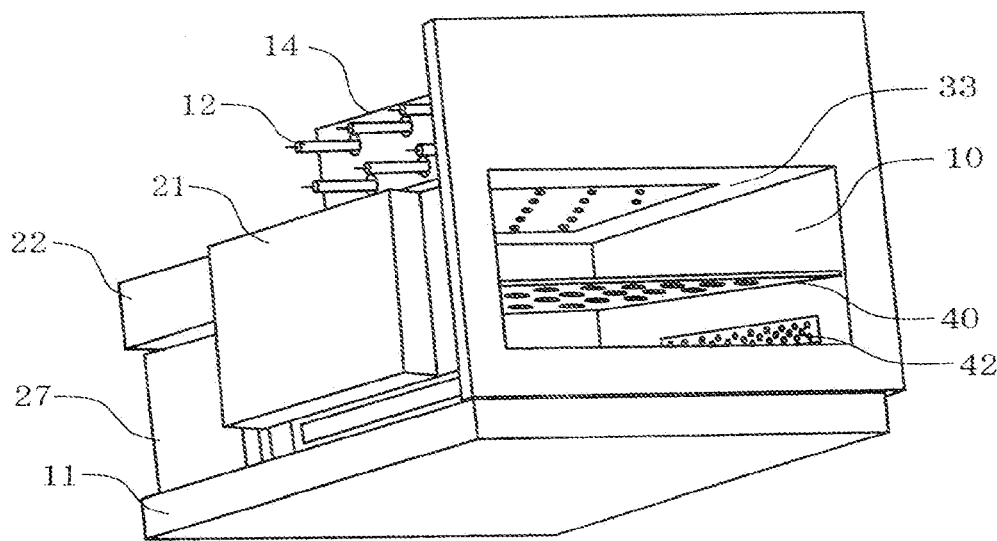
FIG. 3 is a perspective view of the cooking chamber as viewed from obliquely below at the front with the cabinet and door being eliminated.

FIG. 2 is a perspective view of the cooking chamber as viewed from obliquely below at the rear with a cabinet and door being eliminated. FIG. 3 is a perspective view of the same state as viewed from obliquely below at the front. A box-shaped cooking chamber 10 is mounted on a lower frame 11 so as to be located in the central interior of the cabinet 2. The cooking chamber 10 is composed of an electrically conductive material cutting off microwaves except for a bottom plate portion as will be described later.

A heat source box 14 is mounted over the cooking chamber 10 for accommodating a heater 12 serving as a first heat source (heater type heat source). A blower 15 is mounted so as to be located behind the heat source box 14. The blower 15 supplies circulated hot air into the heat source box 14. A blower motor 16 is mounted on the blower 15 for driving the blower 15. A hot air generating device 18 comprises the heater 12, heat source box 14, blower 15 and blower motor 16.

A right hot air returning duct 20 is provided outside a right sidewall as viewed at the door 3 side of the cooking chamber 10. The duct 20 returns the hot air having passed through the cooking chamber 10 to the hot air generator 18. A left hot air returning duct 21 is also provided outside a left sidewall for the same purpose. A hot air return merging duct 22 is provided below the blower 15 in the upper rear of the cooking chamber 10. Hot air having passed through the duct 20 and hot air having passed through the duct 21 merge in the duct 22 to be returned to the blower 15.

A control box 27 is provided under the duct 22 in the lower rear of the cooking chamber 10. The control box 27 accommodates a microwave generator 24 serving as a second heat source and a control device 26 (See FIG. 15). A wave guide 28 is mounted under the bottom of the cooking chamber 10 for guiding microwaves generated by the microwave generator 24 to the central bottom plate of the cooking chamber.

Figure 4:
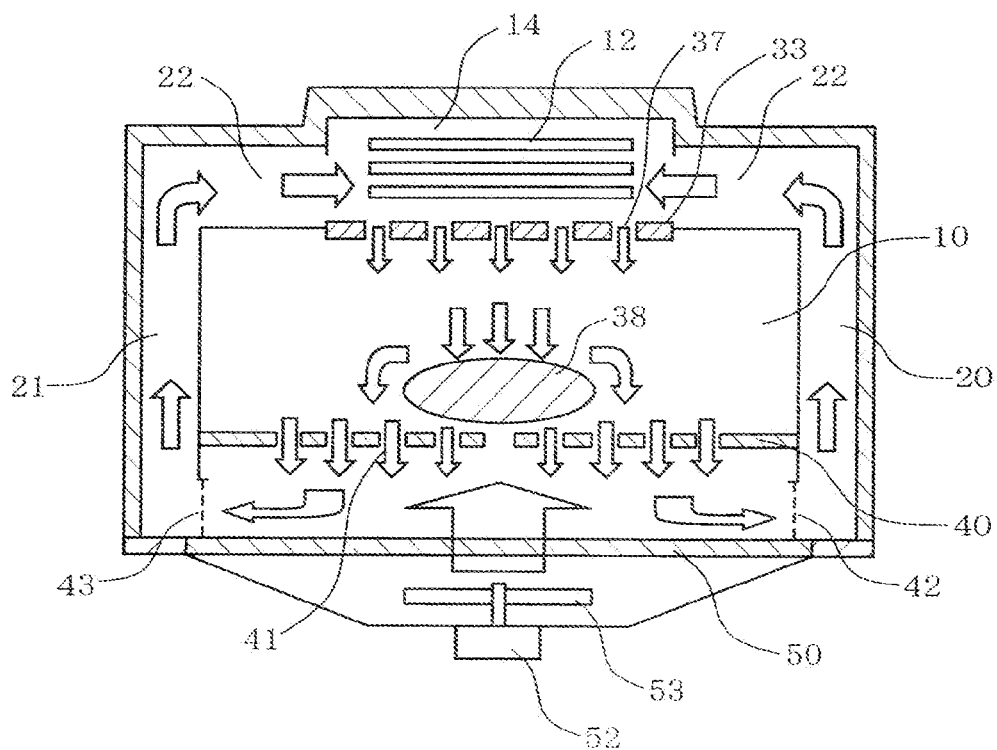
FIG. 4 is a schematic sectional view of the heating cooker as viewed from the front, showing a flow of hot air.
Figure 5:
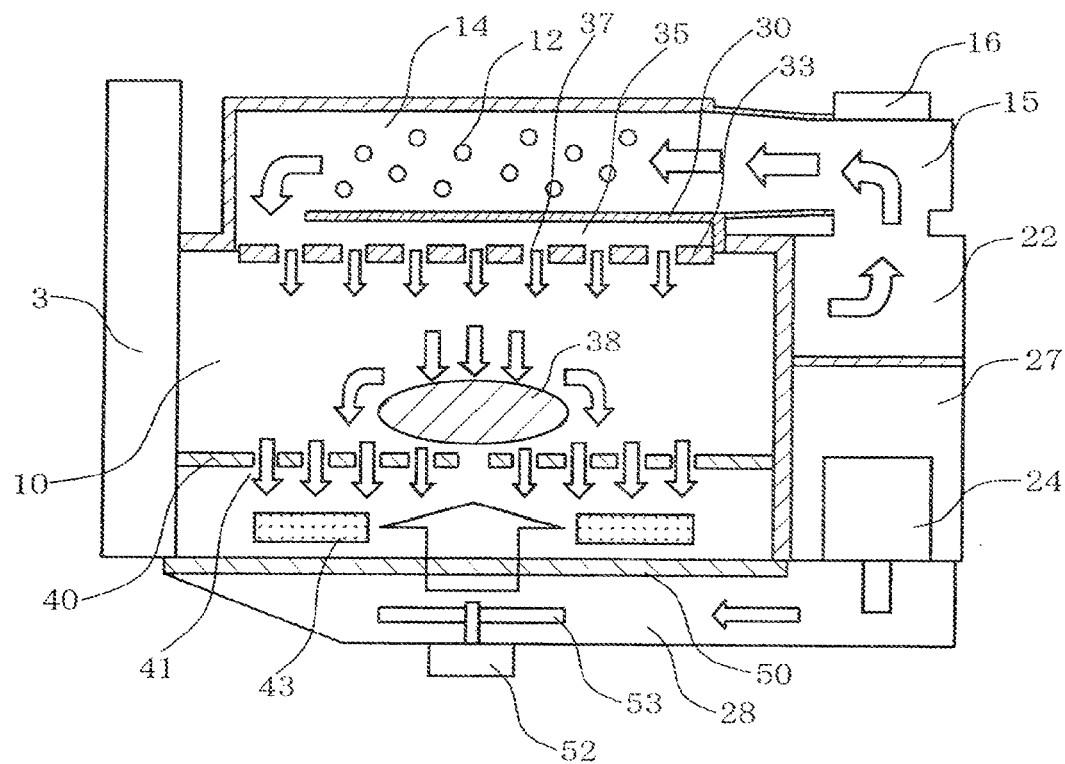
FIG. 5 is a schematic sectional view of the heating cooker as viewed from the right sidewall, showing a flow of hot air.

FIGS. 4 and 5 schematically show flows of hot air in the cooking chamber 10. FIG. 4 shows a flow of hot air in the cooking chamber as viewed from the front. FIG. 5 shows a flow of hot air in the cooking chamber as viewed from the right sidewall. Circulating air produced by the blower 15 is horizontally blown into the heat source box 14 mounted on the upper part of the cooking chamber 10. A plurality of U-shaped heaters 12 serving as a first heat source is mounted in the control box 14 so as to be arranged in the same horizontal direction as the supplied circulating air flows. Heat exchange takes place between the circulating air and the heaters 12 so as to be changed into hot air.

Figure 6:
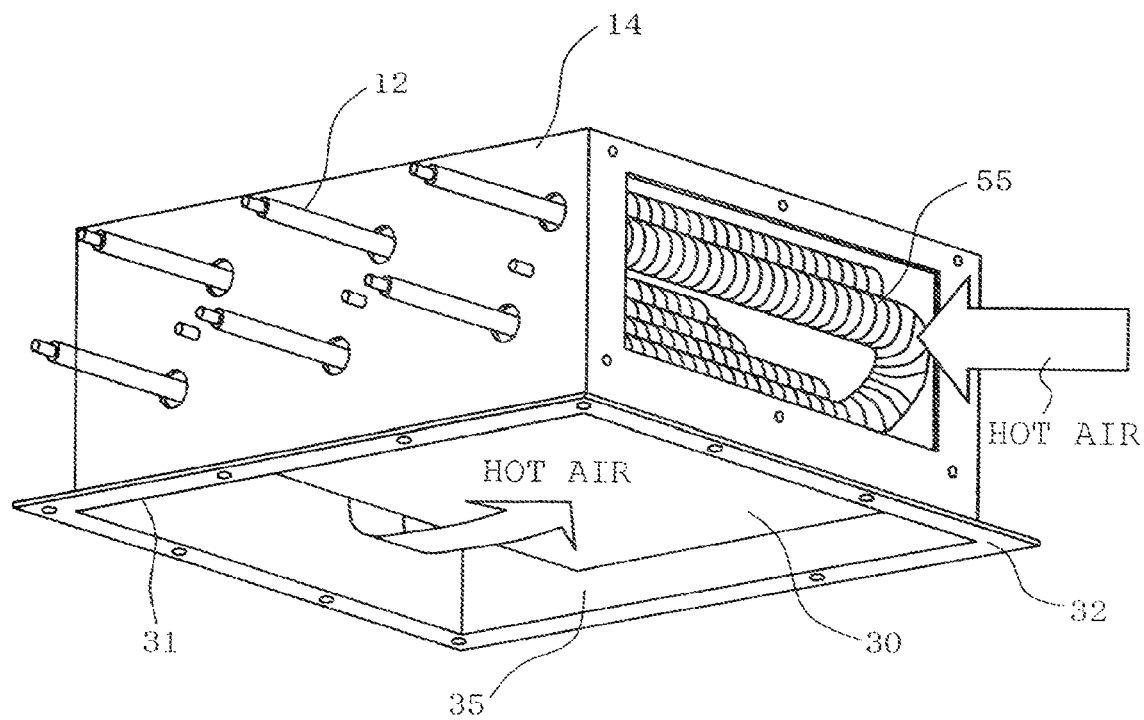
FIG. 6 is a perspective view of a heat source box as viewed from obliquely below.

A partition plate 30 is mounted on the heat source box 14 so as to be located below the heaters 12. The partition plate 30 limits a flow of the circulation air to a direction in which the heaters 121 are arranged. FIG. 6 is a perspective view of the heat source box 14 as viewed from obliquely below. The heat source box 14 has a lower opening 31 located below the partition plate 30. The heat source box 14 is fixed to a ceiling plate 33 of the cooking chamber 10 by making use of a peripheral flange 32 of the opening 31. Under the condition where the heat source box 14 is fixed, a space 35 is defined between the ceiling plate 33 and the partition plate 30 of the cooking chamber 10. The circulation air is caused to pass through the space 35. The circulation air is changed by heat exchange with the heaters 12 into hot air which flows into the space 35 under the partition plate 30.

A plurality of nozzle holes 37 is provided in the ceiling plate 33 of the cooking chamber 10. Circulation hot air is supplied through the nozzle holes 37 into the cooking chamber 10. Since the circulation air produced by the blower 15 has a high pressure, the circulation hot air having flowed into the space under the partition plate 30 is supplied through the nozzle holes 37 as high-speed jet into the cooking chamber 10.

A shelf plate 40 on which an object 38 to be cooked is horizontally mounted in the lower interior of the cooking chamber 10. High-speed jet of hot air supplied out of the nozzle holes 37 impinges on the object 38 such that heat energy of the hot air is applied to the object 38, thereby heating the object. The heat transfer coefficient can be improved to a large extent when an impinging speed of hot air is rendered higher in the case where an object to be cooked is heated by impinging the hot air on the object. This is known as an impinging jet heat transfer technique. The impinging jet heat transfer technique is applied to the heating cooker of the embodiment.

Figure 11:
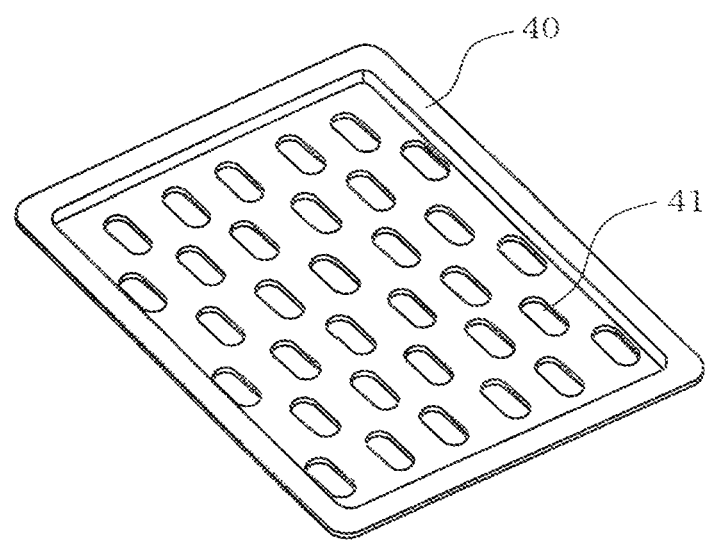
FIG. 11 is a perspective view of a shelf plate.

The shelf 40 has a number of through holes 41 (also see FIG. 11). Hot air having impinged on the object 38 flows through the holes 41 into the space under the shelf plate 40. The right sidewall of the cooking chamber 10 is provided with a right hot air suction opening 42 formed in a part thereof located lower than the shelf plate 40, whereas the left sidewall of the cooking chamber 10 is provided with a left hot air suction opening 43. Circulation hot air having flowed into the space under the shelf plate 40 further flows through the right and left hot air suction openings 42 and 43 into the hot air return ducts 20 and 21. Outer plates at the cooking chamber 10 side of the right and left hot air return ducts 20 and 21 are common with outer plates composing the right and left sidewalls of the cooking chamber 10. The outer plates composing the right and left sidewalls of the cooking chamber 10 serve as partition plates between the interior of the cooking chamber 10 and the hot air return ducts 20 and 21 respectively.

The right and left hot air return ducts 20 and 21 communicate with the hot air return merging duct 22 mounted on the underside of the blower 15. The circulation hot air having flowed into the right and left hot air return ducts 20 and 21 further flows upward along the ducts 20 and 21 into the duct 22, in which the circulation hot air from the duct 20 and the circulation hot air from the duct 21 are merged together. The hot air return merging duct 22 communicates with the blower 15 and accordingly, the merged circulation hot air is drawn into the blower 15. The air is again accelerated by the blower 15 to be supplied into the heat source box 14 with increase pressure.

The hot air is repeatedly circulated through the foregoing flow path with a flow speed thereof being increased by the blower 15. The hot air is brought into contact with the heater 12 in the course of flow, thereby obtaining heat energy. The obtained heat energy is given to the object when the hot air impinges on the object. As a result, heat is applied to the surface of the object 38.

In the heating cooker 1 of the embodiment, microwave heating is also used so that the object is internally heated, as well as heat application to the object surface. Microwaves are generated by the microwave generator 24 disposed in the lower rear of the cooking chamber 10. The microwaves are guided through the waveguide 28 mounted on the underside of the cooking chamber 10 to the vicinity of the central underside of the bottom plate of the cooking chamber 10 (see FIG. 5). The bottom plate 50 of the cooking chamber 10 is made of a dielectric material through which microwaves can easily pass, such as ceramics, glass or the like. A rotating antenna 53 is mounted on the underside of the bottom plate 50 so as to be rotated by an electric motor 52. The microwaves are reflected and agitated by the rotating antenna 53, passing through the bottom plate 53. The microwaves are thus irradiated uniformly in the cooking chamber 10. The object 38 absorbs the microwaves thereby to be heated internally.

Figure 7:
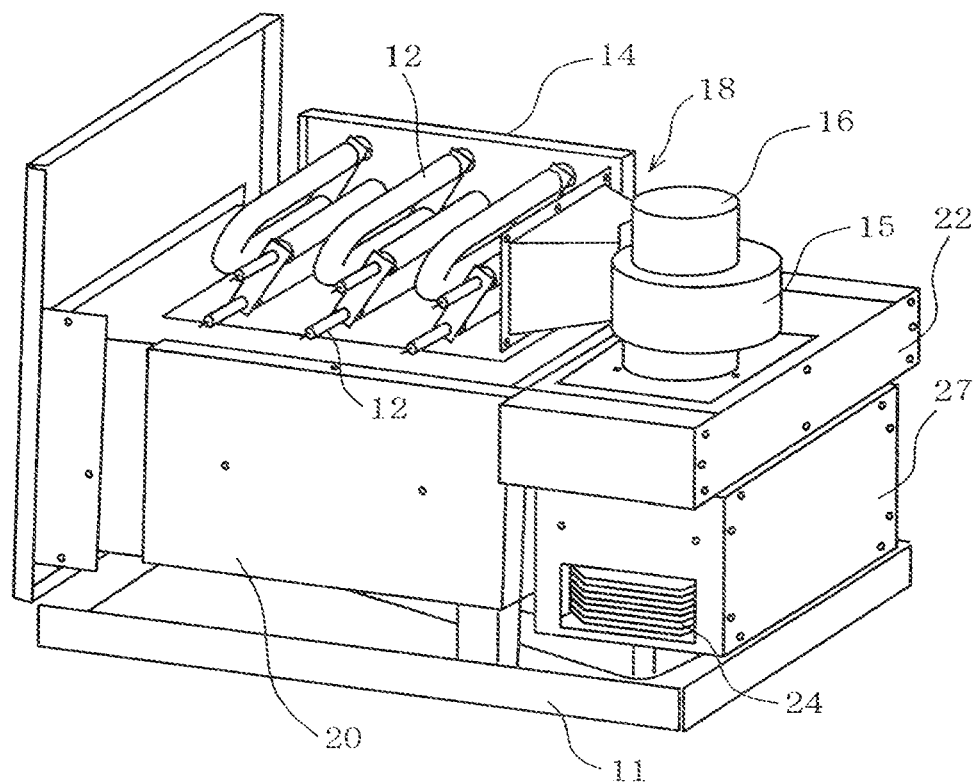
FIG. 7 is a perspective view of the heating cooker with a part of an outer plate of the heat source box being eliminated so that the arrangement of the heater is shown more clearly.
Figure 8:
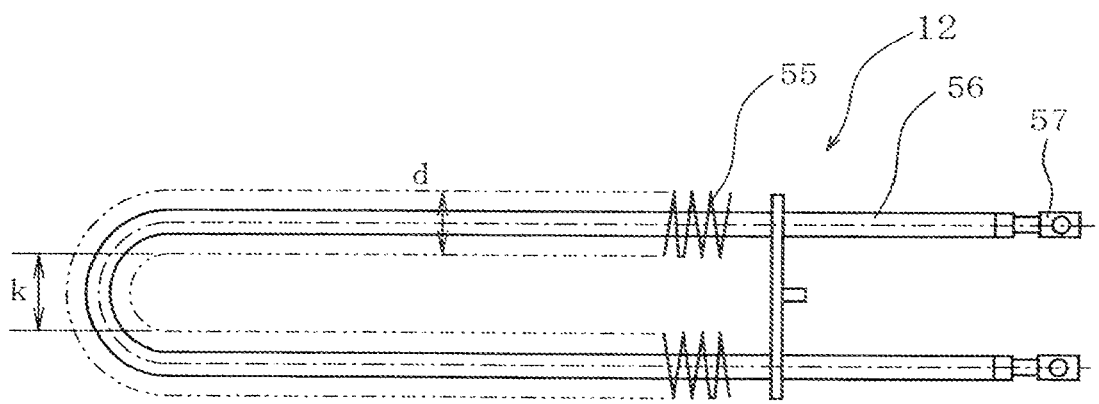
FIG. 8 is a view showing a profile of a U-shaped heater.

The construction of the heater 12 provided in the heat source box 14 will be described. FIG. 7 is a perspective view of the heating cooker with a part of an outer plate of the heat source box being eliminated so that the arrangement of the heater is shown more clearly. As shown in FIG. 8, each heater 12 includes a U-shaped sheathed heater 56 and a number of disc-shaped heat radiating fins 55 attached to the periphery of the sheathed heater 56 so that heat exchange with the circulation hot air is improved. Heater terminals 57 are attached to both ends of the sheathed heater 56 respectively.

Six heaters 12 are arranged and mounted at regular intervals in the horizontal direction that is the same direction as the flow of circulation hot air supplied from the blower 15. The heaters 12 are arranged so that the heater terminals 57 are located alternately at the right and left sides relative to the direction of flow of the circulation hot air (see FIG. 7). As a result, heat exchange is carried out in the same manner at the right and left sides relative to the direction of flow of the circulation hot air.

Figure 9:
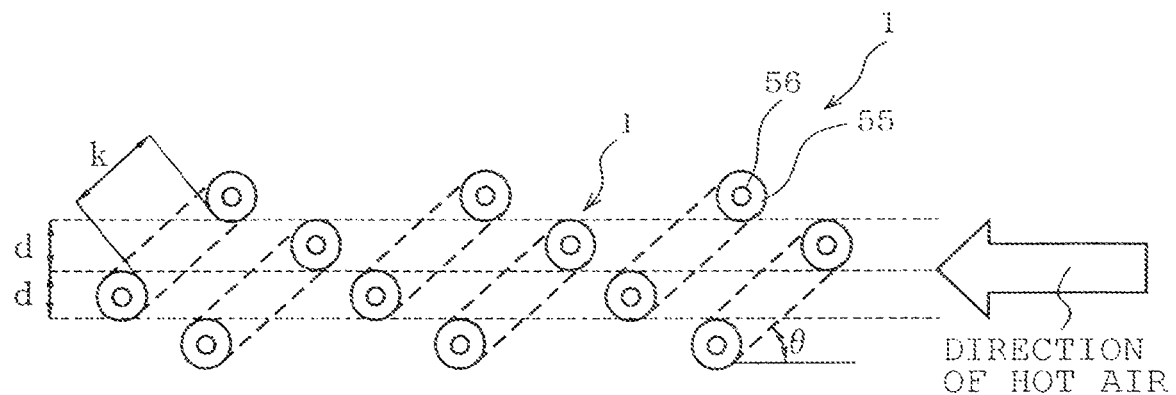
FIG. 9 is a longitudinal section explaining the mounting of heaters.

Furthermore, U-shaped planes which are planes including respective U-shaped sheathed heaters 56 are inclined relative to the direction of flow of the circulation hot air, and the U-shaped heaters 56 are vertically displaced alternately so as to be zigzag aligned. FIG. 9 is a longitudinal section explaining the mounting of heaters 12. More specifically, each odd-numbered heater 12 and each even-numbered heater 12 are displaced from each other by an outer diameter d of the heat radiating fins 55 in the direction at right angle with the direction of flow of circulation hot air. Furthermore, all the heaters 12 are mounted so as to be inclined at an angle $\theta$ to the direction of flow of circulation hot air. The angle $\theta$ is set so that peripheries of the heat radiating fins 55 of the adjacent heaters 12 are overlapped as viewed in the direction of flow of circulation hot air.

The angle $\theta$ is calculated from the following relational expression:

$$d = k \cdot \sin \theta$$

where d is an outer diameter of the heat radiating fins 55 and k is an interval between U-shaped portions of heat radiating fins 55. When the six heaters 12 are mounted in the above-described manner, the peripheries of the heat radiating fins 55 of the adjacent heaters 12 are overlapped as viewed in the direction of flow of circulation hot air. In this state, a smallest amount of hot air passes without heat exchange with the heat radiating fins 55. Furthermore, since pressure loss of hot air is not so large, the heat exchange can efficiently be carried out between the circulation hot air and the heaters 12. Amounts of heat of the respective heaters 12 are set so as to be reduced from the entrance side of the heat source box 14 toward the exit side thereof by adjustment of electrical resistance values, whereby downstream heaters are prevented from overheating.

Figure 10:
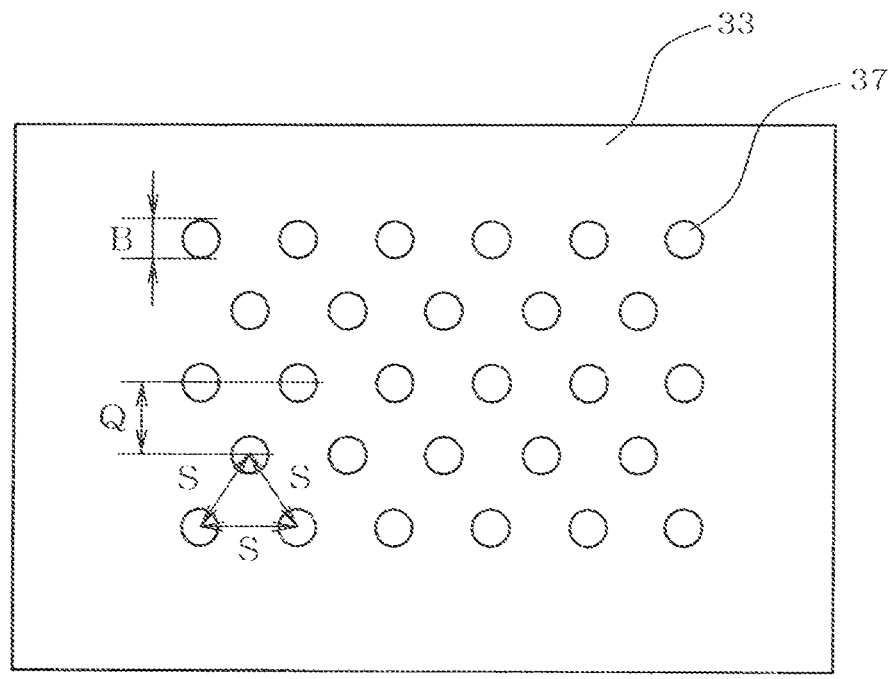
FIG. 10 shows an example of shape and arrangement of nozzle holes provided in a ceiling.

The arrangement of plural nozzle holes 37 will now be described. The nozzle holes 37 are formed in the ceiling plate 33 of the cooking chamber 10 in order that the circulation hot air may be supplied into the cooking chamber 10. FIG. 10 shows an example of shape and arrangement of nozzle holes 37. Each nozzle 37 has a cross-sectional shape of a circle with a diameter B in the example. The nozzle holes 37 are arranged into a matrix.

Rows of nozzle holes 37 are provided at an equal pitch S laterally as viewed in the figure. Columns of nozzle holes 37 are provided at an equal array pitch Q ($=3^{1/2} \cdot S/2$) longitudinally as viewed in the figure. The rows of nozzle holes 37 are shifted by S/2 laterally at every other row. As the result of this arrangement, center-to-center distances are equal to the pitch S among two nozzle holes 37 of each row and one nozzle hole 37 belonging to the neighboring row and located laterally in the middle of the two nozzle holes. The centers of the aforesaid three nozzle holes 37 constitute vertexes of an equilateral triangle with each side of S.

When the steel ceiling plate 33 with the foregoing arrangement of nozzle holes 37 is irradiated with microwaves from below, it is known that an attenuation A of the microwaves before or after passing through the steel ceiling plate 33 with the above-described nozzle hole arrangement is shown by the following equation:

$$A = 20 \log_{10}(1.55 \cdot Q \cdot \lambda / (\pi \cdot B^3)) + 32t/B$$

where t is a thickness of the ceiling plate 33 and λ is a wavelength of the microwaves.

Microwaves irradiated through the bottom plate 50 but not absorbed into the object 38 reach the ceiling plate 33. In order that microwaves may be prevented from leaking through the nozzle holes 37 over the cooking chamber 10, the values of B, S and t need to be determined so that the attenuation A is increased. For example, when the nozzle hole diameter B is 20 mm, the nozzle pitch S is 40 mm, the plate thickness t is 0.5 mm and the wavelength λ is 120 mm (corresponding to frequency of 2450 MHz), the attenuation A takes the value of 20 dB and can accordingly be attenuated to a hundredth part or below. In this case, the nozzle hole diameter of 20 mm corresponds to one sixth of the wavelength λ, and the nozzle pitch of 40 mm corresponds to two sixths of the wavelength λ.

The construction of the shelf plate 40 on which the object 38 is placed will now be described. The shelf plate 40 has a number of holes 41 as shown in FIG. 11. The holes 41 are provided for causing the circulation hot air to flow under the shelf plate 40 after the circulation hot air has been supplied from the nozzle holes 37 to impinge on the object 38. Furthermore, the bottom plate 50 is made of a dielectric material microwaves easily penetrate in order that microwaves irradiated through the bottom plate 50 may be absorbed to the object 38 placed on the shelf plate 40.

An impinging jet heat transfer technique is applied to the heating cooker 1 of the embodiment for surface heating of the object 38. The impinging jet heat transfer technique necessitates efficient transfer to the object 38 of heat energy of hot air supplied from the nozzle holes 37. For this purpose, the arrangement of the nozzle holes 37 and distances between the object 38 and the nozzle holes 37 need to be set at respective suitable values.

Figure 12:
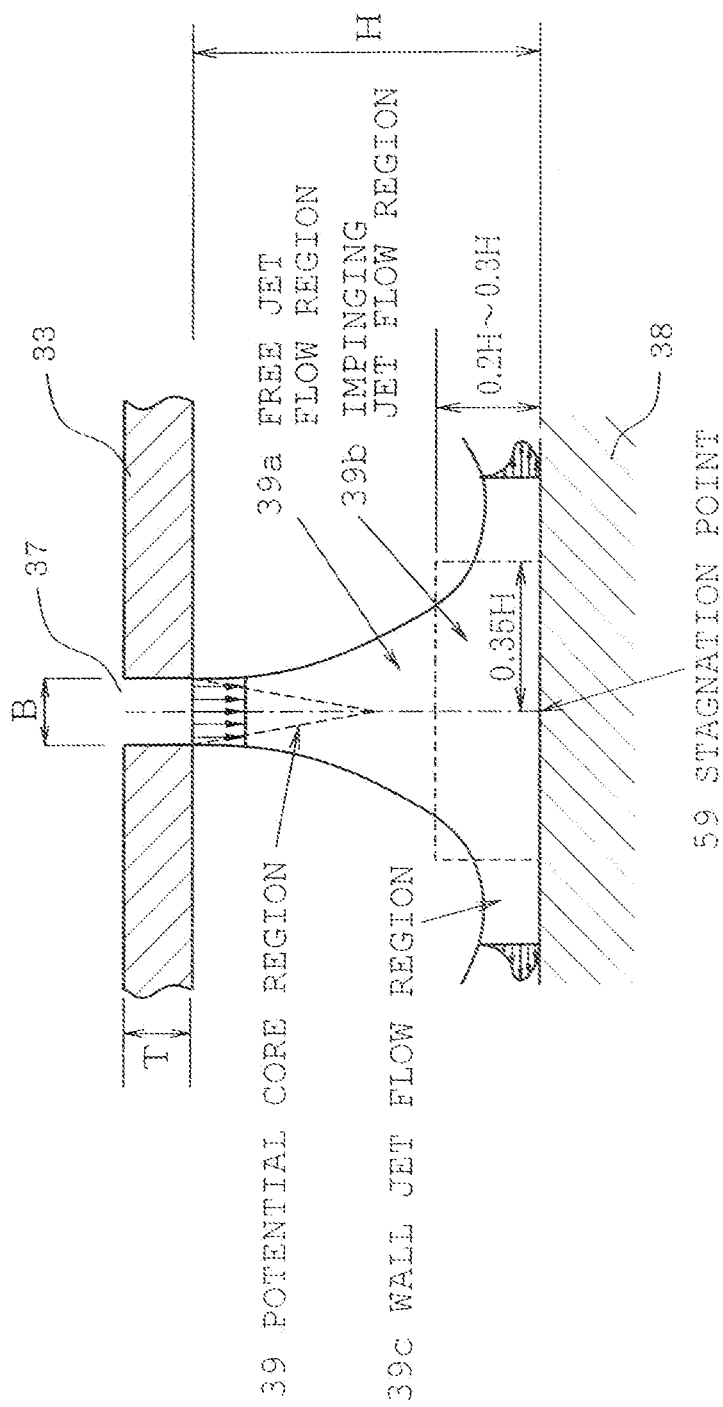
FIG. 12 is a view showing a frame format of jet flow from one nozzle hole.

FIG. 12 schematically shows a manner of jet flow when the jet flow from one nozzle hole 37 is caused to impinge on the object 38 which is away from the nozzle hole 37 by a distance H. The manner of jet flow differs depending upon a location but may be classified into the following four regions: the first region is referred to as "potential core region" 39 which is a region where the jet flow is located immediately after departure from the nozzle hole 37. In the region, the jet flow has a sectional area that is substantially the same as a sectional area of the nozzle hole 37 and also a flow speed that is substantially the same as a flow speed in the nozzle hole 37.

The second region is referred to as a "free jet flow region" 39a which is continuous from the first region. In the second region, the jet flow is gradually spread such that an area thereof is accordingly increased but a flow speed thereof is gradually decreased. The third region is referred to as an "impinging jet flow region" 39b which is formed by impingement of the jet flow on the object 38. The jet flow impinges on the object 38, imparting heat energy to the object and changing to a direction parallel to the surface of the object 38. A stagnation point 59 is formed near the surface of the object 38. The stagnation point 59 is located beneath the nozzle hole 37. The flow speed of the jet flow is lower at the stagnation point 59. When H designates a distance from the nozzle hole 37 to the surface of the object 38, the impinging jet flow region 39b has the shape of a disc having the stagnation point 59 as the center of the disc and a radius represented as 0.35H and a height ranging from 0.2H to 0.3H.

The fourth region is referred to as a "wall jet flow region" 39c defined outside the impinging jet flow region 39b. The jet flow is caused to flow in parallel to the surface of the object 38, and a flow speed is reduced as the jet flow departs from the stagnation point 59. The jet flow supplied from the nozzle hole 37 pushes away the hot air which has impinged on the surface of the object 38 and reduced a flow speed thereof, thereby contacting the object 38 successively. Thus, heat energy of the jet flow is efficiently transferred to the object 38, whereby heat is quickly applied to the object 38.

Figure 13:
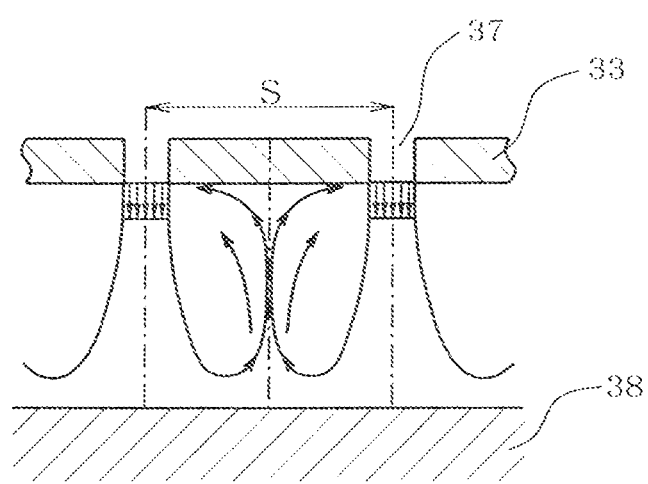
FIG. 13 is a view showing a frame format of jet flow in the case where a center-to-center distance S of two nozzle holes is set so as to be broader.

The foregoing explanation exemplifies a single nozzle hole 37. On the other hand, when the plural nozzle holes 37 are provided as in the embodiment, a plurality of jet flows supplied from the adjoining nozzle holes 37 interferes with each other, whereupon the manner of jet flow changes. FIG. 13 shows a manner of jet flow in the case where a center-to-center distance S of two nozzle holes is set so as to be broader. The hot air impinges on the object 38 to impart heat energy to the object, whereupon the temperature of the jet flow is reduced. In this case, the hot air flowing toward the neighboring jet flow interferes with the latter, rising up. The hot air then intermingles with new high-temperature jet flow thereby to reduce the temperature of the new jet flow.

This phenomenon results in a reduction in the heating efficiency and a large unevenness in the intensity of impingement on the object, rendering uniform heating difficult. In order that this may be prevented, it is important that the center-to-center distances S and the distances H from the nozzle holes 37 to the object 38 should be set at respective suitable values.

Figure 14:
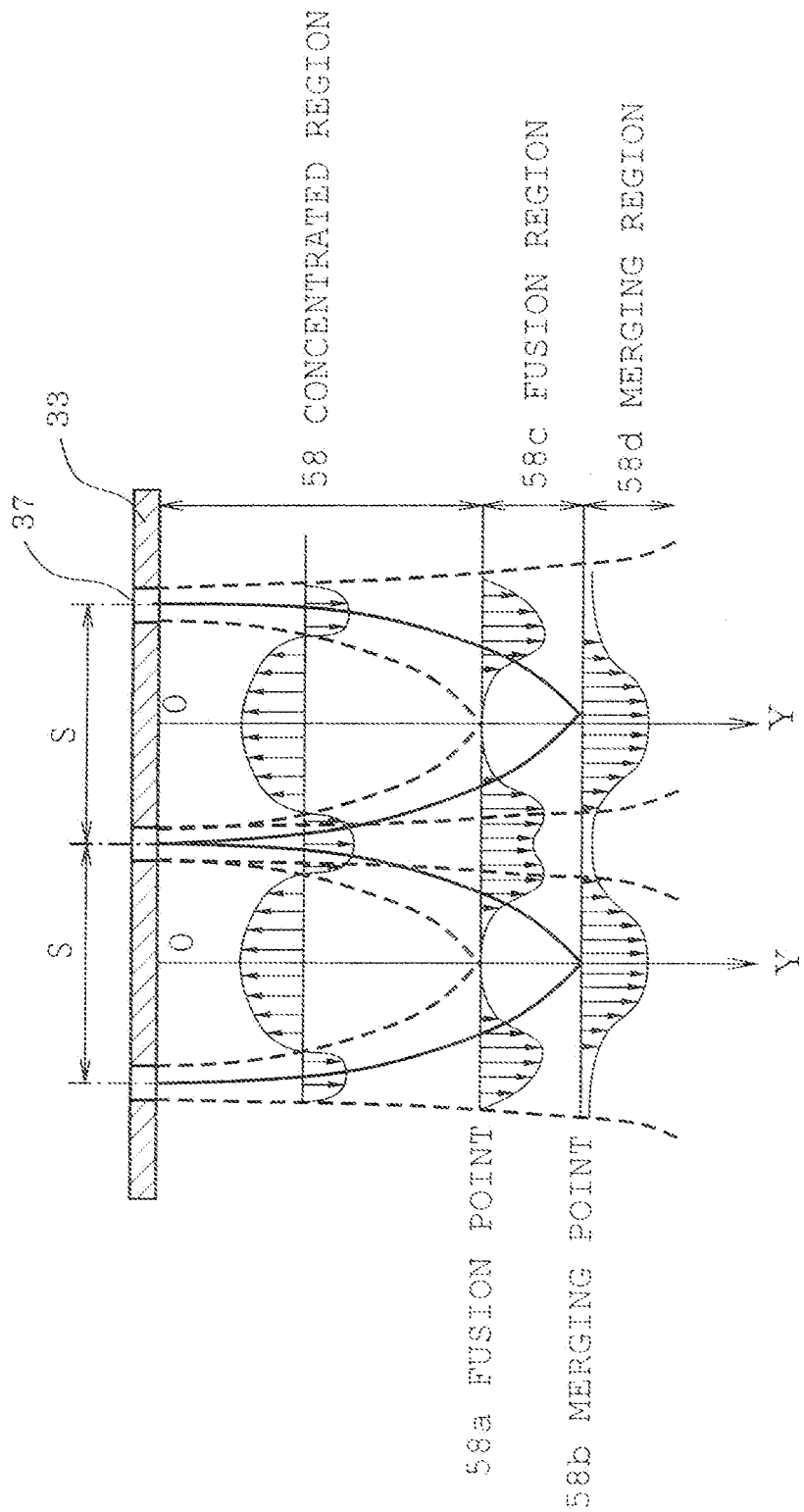
FIG. 14 is a view showing a frame format of jet flow in the case where hot air is blown off from a plurality of nozzles with no object to be cooked being placed.

FIG. 14 schematically shows a manner of jet flow in the case where hot air is blown off from three nozzle holes 37 with no object 38 to be cooked being placed. Mutual interference occurs between adjacent jet flows such that the flow speed and direction of a principal portion of the jet flow are shown as arrows in the figure. A flow speed on the line Y is characteristic. The line Y is drawn downward from an intermediate position O between two nozzle holes 37. The flow speed on the line Y varies to a large degree depending upon the distance from the intermediate position O. A flow speed in a concentrated region as shown in the figure represents a large value with the jet flow being directed to the intermediate position O.

The flow speed of the jet flow toward the intermediate position O is reduced as the jet flow departs from the intermediate position on the line Y. The flow speed becomes substantially zero at a fusion point 58a in the figure. At the fusion point 58a, part of the jet flow where the flow speed is higher is beneath each nozzle hole 37.

Two adjacent parts which exists at the fusion point 58a and in each of which the flow speed is higher are merged into one part at a merging point 58b which is further away from the intermediate position O on the line Y in the figure. The merged part constitutes a downward faster flow about the line Y. Subsequently, the downward faster flow part exists only in the part about the line Y in a merging region 58d lower than the merging point 58b, but no flow part flowing to the intermediate position O.

The object 38 is placed in the merging region 58d lower than the merging point 58b in FIG. 14 in order that strong hot air may impinge on the object 38 and the hot air may be prevented from flowing to the ceiling plate 33 side after the impingement. It is known that a distance ycp from each nozzle 37 to the merging point 58b is shown by the following experimental formula:

$$ycp = 3.514 B \cdot (S/B)^{0.673}$$

For example, when each nozzle hole 37 has a diameter B of 20 mm and the center-to-center distance S of two nozzle holes 37 is 20 mm, the distance ycp to the merging point 58b becomes 110 mm. In the embodiment, the shelf plate position is determined so that a distance between the ceiling plate 33 and the surface of the object 38 becomes equal to the distance ycp obtained from the above formula. Consequently, an amount of hot air returning toward the ceiling plate 33 after impingement on the object 38 is reduced and accordingly, the heating efficiency can be improved.

Figure 15:
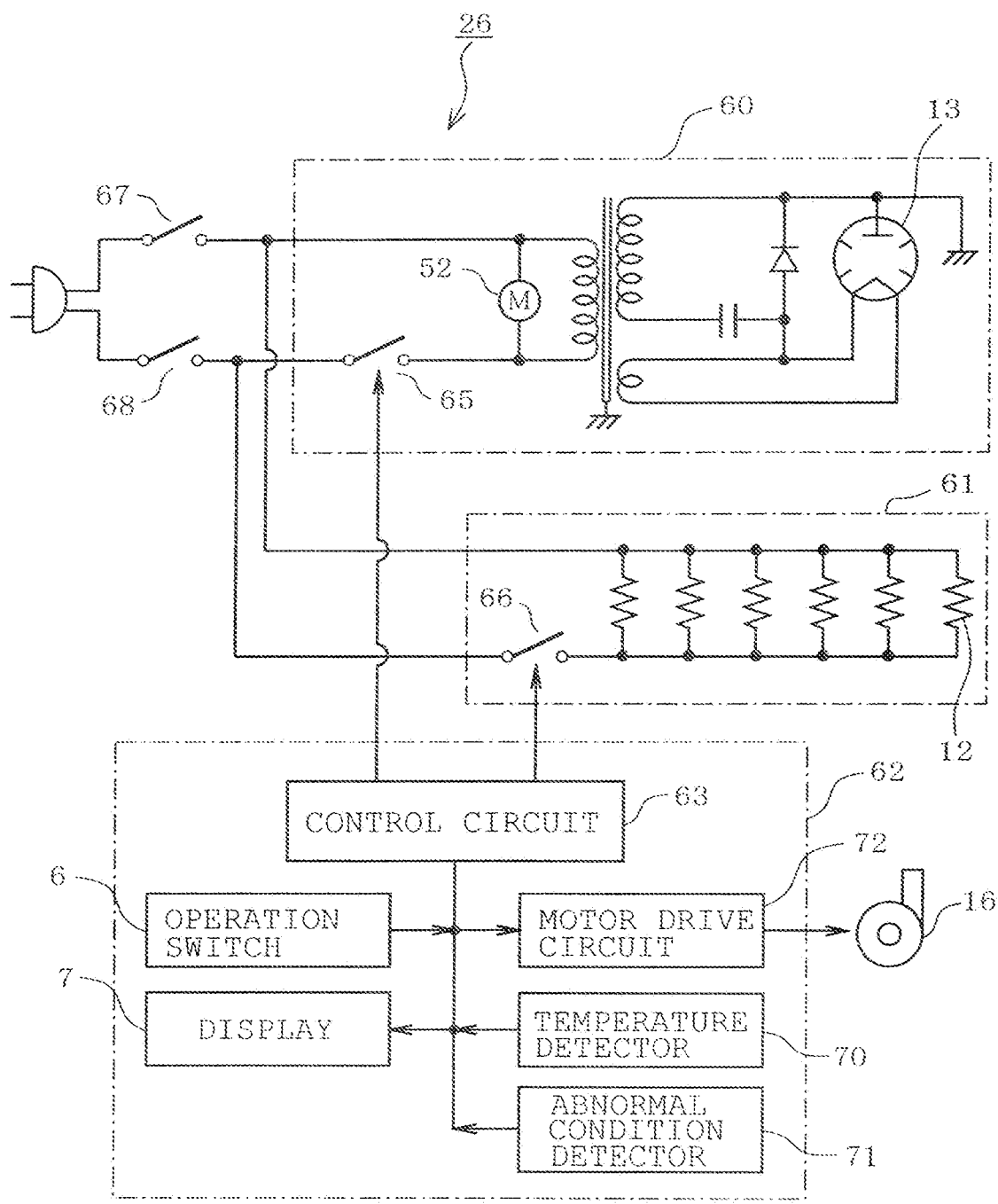
FIG. 15 is a view showing a circuit arrangement of a control device.

FIG. 15 schematically shows an arrangement of the control device 26 of the heating cooker 1. The control device 26 comprises a microwave generating circuit section 60, a heater circuit section 61 and a control circuit section 62 controlling the foregoing circuits and the blower motor 16. The microwave generating circuit section 60 includes a magnetron 13 which generates a microwave with a frequency of 2450 MHz, and an electric motor 52 for a rotating antenna 53 which reflects and agitates the microwave. Power is supplied from a commercial power source, and a switch 65 is turned on and off thereby to turn the power source on and off. The heater circuit section 61 supplies electric power to six heaters 12. The power supply is controlled by controlling the commercial power source by the switch 66.

The control circuit section 62 includes a control circuit 63, an operation switch 6, a display 7, a temperature detector 70, an abnormal condition detector 71 and a motor drive circuit 72. The control circuit 63 controls an overall operation of the heating cooker 1 and is composed of a microcomputer. The switches 65 and 66 are turned on and off and the blower motor 16 is driven by the control circuit 63. The operation switch 6 is provided for input of a cooking time, a hot air temperature, a name of food and the like. The display 7 is provided for displaying input information, cooking status and the like. The temperature detector 70 comprises a thermistor detecting temperatures of circulation hot air near a right or left hot-air suction opening 43 or 42. The abnormal condition detector 71 is provided in the heat source box 14 for detection of an abnormal condition. Switches 67 and 68 in the figure are interlock switches interlocking the door 3 in operation.

The operation of the heating cooker thus constructed will now be described. The object 38 to be cooked is placed on the shelf plate 40 in the cooking chamber 10 and thereafter, the door 3 is closed. The switches 67 and 68 which are door interlock switches are then turned on. When electric power is supplied from the commercial power source through a DC power supply circuit (not shown), the control circuit 63 stands by for operation input. When a cooking time, a hot air temperature (cooking temperature), a name of food and the like are supplied through the operation switch 6 into the control circuit 63 by an operator, the control circuit 63 operates as follows.

When the operator uses the operation switch 6 to supply instructions to start cooking, the control circuit 63 turns on the switch 65 to operate the microwave generating circuit section 60. As a result, the magnetron 13 starts generating microwaves. At the same time, electric power is supplied to the motor 52 so that the rotating antenna 53 is rotated. The generated microwaves are transferred through the waveguide 28 into the space below the cooking chamber 10. The microwaves are reflected and agitated by the rotating antenna 53 thereby to penetrate the bottom plate 50, whereupon the microwaves are uniformly irradiated in the cooking chamber 10.

The control circuit 63 also turns on the switch 66 simultaneously with the switch 65 so that power is supplied to the heater 12 and also to the blower motor 16 through the motor drive circuit 72, whereby circulation air flow is produced. The control circuit 63 adjusts an on/off period and controls so that a temperature detected by the temperature detector 70 corresponds with a set temperature supplied from the operation switch. The blower motor 16 comprises a DC motor in which a rotational speed is variable depending upon an applied voltage. The control circuit 63 adjusts the rotational speed of the blower motor 16 to a rotational speed corresponding to the name of object supplied from the operation switch 6.

The circulation air produced by the blower 15 is converted to circulation hot air when the temperature of the heater 12 is increased. The circulation hot air is supplied as jet flow from the nozzle holes 37 provided in the ceiling plate 33 into the cooking chamber 10. The circulation hot air having impinged on the object 38 flows into the space under the shelf plate 40 to be drawn in through the right and left hot-air suction openings 42 and 43. The circulation hot air flows through the right and left return ducts 20 and 21 and thereafter merges in the hot air return merging duct 22. The circulation hot air re-flows into the blower after merger thereby to be accelerated and blown against the heat source box 14. Heat is re-supplied to the circulation hot air by the heater 12 such that the temperature of the circulation hot air is increased. The circulation hot air is then supplied into the cooking chamber 10 again. The high-temperature hot air impinges on the surface of the object 38 while being circulated, whereupon the object 38 is quickly heated from the surface thereof. Radiation of microwaves is applied through the bottom plate 50 of the cooking chamber 10 to the object along with the heating by the circulation hot air. The object 38 absorbs the microwaves thereby to be quickly heated inside.

Figure 16:
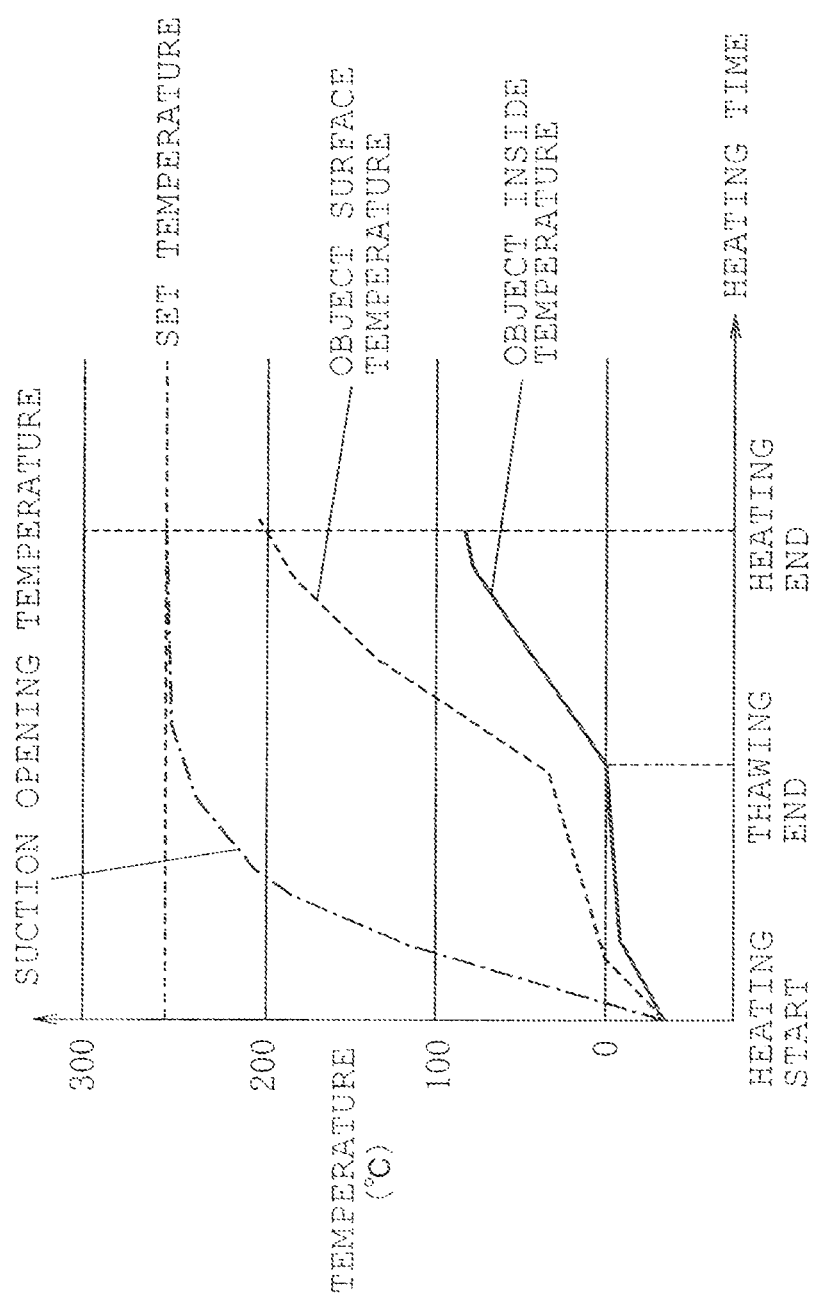
FIG. 16 shows an example of temperature changes in the surface and inside of the object when a frozen object is cooked by the heating cooker.

FIG. 16 shows an example of temperature changes in the surface and inside of the object 38 when a frozen object 38 is cooked by the heating cooker 1. The temperatures of the surface and inside of the object 38 start to quickly rise after completion of thawing. This indicates that the object 38 is heated both at the surface thereof and inside thereof. The temperatures of hot air gradually rise near the right and left hot-air suction openings 42 and 43. After the temperatures of hot air have reached set temperatures, the on/off period of the heater 12 is adjusted so that the hot air temperatures are maintained at the set temperatures. This heating manner is continued, and power supply to the microwave generating circuit section 60, heater circuit section 61 and blower motor 16 is shut off such that the heating is finished.

The following effects are achieved from the heating cooker of the above-described embodiment.

(1) Heating is carried out using an impinging jet heat transfer technique that the impinging high-speed jet flow converted from the high-temperature hot air is caused to impinge on the object 38. Consequently, the object 38 can quickly be heated at a high heat transfer coefficient.

(2) Radiation of microwaves is applied through the bottom plate 50 to the object 38 so that the object 38 is heated at the inside thereof. Thus, the microwave heating is also used in combination with the heating by the impinging jet heat transfer technique. Consequently, the object 38 can be heated further quickly.

(3) The circulation hot air is supplied from the nozzle holes 37 provided in the ceiling plate 33 of the cooking chamber 10 and drawn in through the right and left hot-air suction openings 42 and 43 provided in the lower sidewalls located lower than the shelf plate 40. Consequently, since the bottom plate 50 of the cooking chamber 10 is provided with no components such as nozzle holes or suction openings, the interior of the cooking chamber 10 can easily be cleaned.

(4) The object 38 is placed on the shelf plate 40, and the holes 41 are formed in the shelf plate 40 so that the high-temperature hot air flows through the holes 41 to the underside of the shelf plate 40. Consequently, since the shelf plate 40 is heated such that the object 38 receives heat from the underside of the shelf plate 40, the object 38 can be heated further quickly.

(5) The sidewalls of the cooking chamber 10 are utilized as the sides of the right and left hot-air suction openings 42 and 43 through which the circulation hot air is returned to the blower 15, respectively. Consequently, heat can be prevented from leaking out of the cooking chamber 10. At the same time, since the sidewalls of the cooking chamber is heated by the heat energy of the returning circulation hot air, the temperature in the heating chamber 10 can efficiently be increased.

(6) The heaters 12 mounted in the heat source box 14 are inclined at such an angle that peripheries of the radiating fins 55 of the heaters 12 adjacent to each other are seen as overlapped when viewed in the direction of air flow. Consequently, an amount of hot air passing without heat exchange with the radiating fins 55 can be minimized. Furthermore, since the resistance against flow of air is not rendered so high, the heat exchange can efficiently be carried out between the circulation hot air and the heaters 12.

(7) Amounts of heat of the respective plural heaters 12 are set so as to be rendered smaller as the heaters 12 are located downstream with respect to the circulation hot air. Consequently, the surface temperatures of the heaters are uniformed and the downstream heaters which are subject to circulation hot air with a higher temperature can be prevented from overheating.

(8) The partition plate 30 is mounted in the heat source box 14 so as to be located below the heaters 12. The partition plate 30 limits a flow of the circulation hot air to a direction in which the heaters 12 are arranged. Consequently, the circulation hot air blown into the heat source box 14 passes through the heat source box 14 while heat exchange is carried out between the circulation hot air and all the heaters 12, whereupon the efficiency of the heat exchange can be improved.

(9) The distance from the plural nozzle holes 37 provided in the ceiling plate 33 to the surface of the object 38 is set so that jet flows supplied from the adjacent nozzle holes 37 substantially combine together. Consequently, an amount of hot air can be reduced which returns in the direction of the nozzle holes 37 and mixing with new hot air supplied from the nozzle holes 37 thereby to lower the temperature of the new hot air. Accordingly, the heat transfer coefficient from hot air to the object 38 can be improved.

(10) The rotational speed of the motor 52 of the blower 15 generating circulation hot air is adapted to be controllable by an output signal of the control circuit 63. Consequently, optimum heating can be carried out according to a type and shape of the object to be cooked.

(11) The temperature detector 70 detecting the temperature of circulation hot air is provided near the right or left hot-air suction opening 42 or 43. Since the temperature detector 70 is less affected by the radiant heat from the heater 12 when provided near the right or left hot-air suction opening 42 or 43, the temperature of hot air can accurately be detected.

(12) Heating outputs of the heater 12 and the microwave generator 24 each serving as a heat source are adapted to be controlled individually. Consequently, an optimum cooking can be carried out according to the type of the object to be cooked. Furthermore, since heating only by microwaves or heating only by the heater can also be carried out, a large cooking repertoire can be ensured.

(13) Each of the nozzle holes provided in the ceiling plate of the cooking chamber is formed into the shape of a circle with a diameter equal to or larger than one sixth of the wavelength of microwaves or into a polygonal shape in which the circle is inscribed. The nozzle holes are arranged with the center distance equal to or larger than two sixths of the wavelength. The above-described arrangement can reduce an amount of microwave leaking through the nozzle holes 37 over the ceiling plate 33 to a large extent.

(14) When made of a metal, the shelf plate 40 is formed with a plurality of circular or rectangular holes. Each circular hole has a diameter equal to or larger than 1/1.7 of the wavelength of the microwave. Each rectangular hole has a lengthwise dimension larger than one half of the wavelength. When the shape and dimension of each hole are determined as described above, the microwaves can permeate the shelf plate 40 from the underside to the upper surface side. Accordingly, the object placed on the shelf plate can also be heated from the inside.

Other Embodiments

The heating cooker of the foregoing embodiment may be modified as follows.

(1) The above-described heating cooker employs both microwave heating and the hot air heating to which is applied the impinging jet heat transfer technique in which heat is transferred by impinging high-speed hot air blast on an object to be cooked. However, heating may be carried out by either heating method. For example, the components necessitated for the microwave heating may be eliminated and only the hot air heating may be carried out.

Figure 17A:
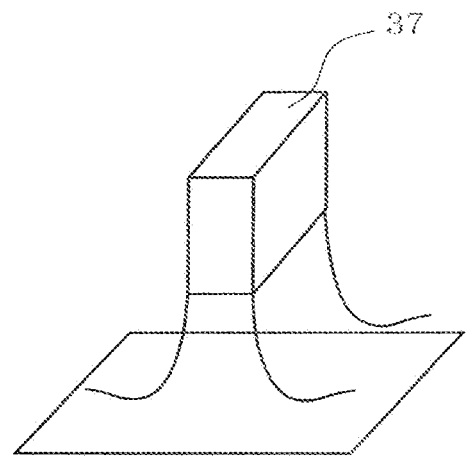
FIGS. 17A and 17B are views showing a jet flow in the case where the nozzle hole has a rectangular section.
Figure 17B:
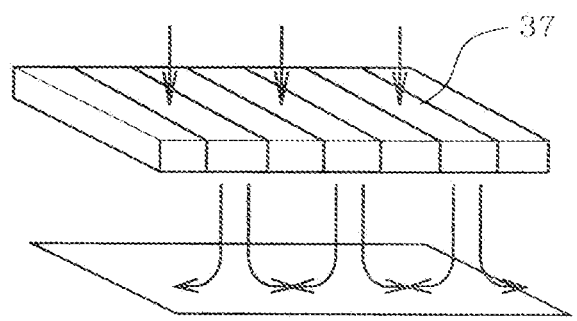
Figures 18A, 18B:
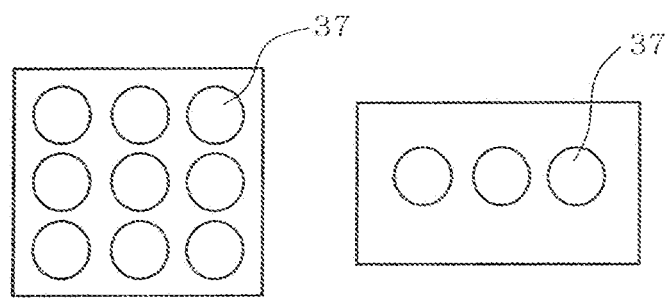
FIGS. 18A to 18D show examples of shape and arrangement of nozzle holes provided in a ceiling.
Figures 18C, 18D:
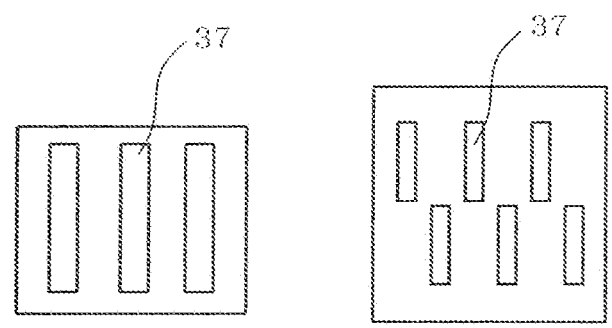

(2) The nozzle holes 37 each of which is provided in the ceiling plate 33 of the cooking chamber 10 and has a circular section are arranged as shown in FIG. 10. Each nozzle hole 37 may have a rectangular section. In this case, the jet flows in the directions as shown in FIGS. 17A, and 17B after impingement. Furthermore, the nozzle holes 37 may be arranged as shown in FIGS. 18A to 18D. FIG. 18A shows nozzle holes 37 each of which has a circular section and which are arranged on points at the intersection of squares. FIG. 18B shows nozzle holes 37 each of which has a circular section and which are aligned at regular intervals. FIG. 18C shows nozzle holes 37 each of which has a rectangular section and which are aligned at regular intervals. FIG. 18D shows nozzle holes 37 each of which has a rectangular section and which are arranged into two zigzag rows.

Furthermore, only a single nozzle hole 37 may be provided. The diameter of the nozzle hole 37 is increased when a large object is heated with the single nozzle hole 37. In this case, the location of the nozzle hole 37 may be changed with lapse of time.

(3) Blasts of circulation air flow through the right and left hot air return ducts 20 and 21 provided outside the sidewalls of the cooking chamber 1 respectively. The blasts of circulation air merge in the hot air return merging duct 22, thereafter being blown against the heat source, box 14 by the single blower 15. However, individual blowers may be used to blow the blasts of circulation hot air from the right and left ducts 20 and 21 against the hot air box 14 respectively, instead. Consequently, a returning path of the circulation hot air can be shortened, and an amount of heat loss in the return path can be reduced.

(4) The hot-air suction openings 42 and 43 are provided in the lower parts of the right and left sidewalls of the cooking chamber 10 in the above-described heating cooker 1. An additional hot-air suction opening may be provided in the rear wall of the cooking chamber 10. In this case, a hot-air return duct may also be provided at the outside of the rear wall of the cooking chamber 10 so that drawn circulation hot air is merged into the hot-air return merging duct 22.

Figure 19:
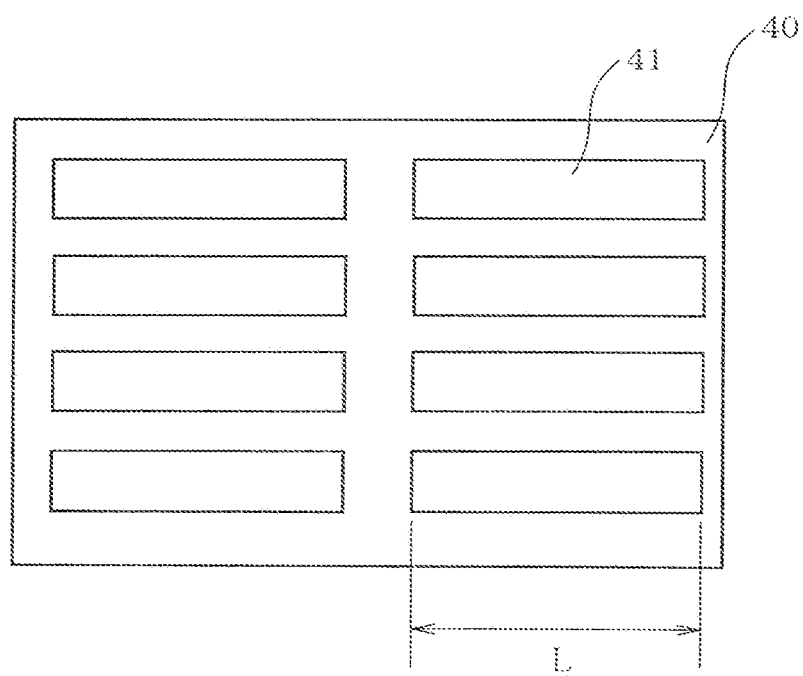
FIG. 19 shows an example of shape and arrangement of holes provided in the shelf plate in the case where the shelf plate is made of a metal.

(5) The shelf plate 40 mounted in the cooking chamber 10 is made of a dielectric material which can easily penetrate microwaves. However, the shelf plate 40 may be made of a metal material such as aluminum. In this case, since the metal material does not penetrate microwaves, each hole 41 provided in the shelf plate 40 is dimensioned so that microwaves are transmissive therethrough. FIG. 19 shows an example of shape and arrangement of holes. A lengthwise dimension L of the rectangular hole 41 is set to be equal to or larger than ½ of the wavelength of the microwaves. Furthermore, when the hole 41 is circular, a diameter thereof is set to be equal to or larger than 1/1.7 of the wavelength of the microwaves. Consequently, the microwaves can reach the object 38, passing through each hole 41.

When the shelf plate 40 is made of a metal material, the microwaves pass through each hole 41 such that an induced current flows around each hole 41, whereby heat is applied to a part of the shelf plate 40 around each hole 41. Accordingly, the temperature of the shelf plate 40 is increased by the microwave heating as well as by hot air heating.

Figure 20A:
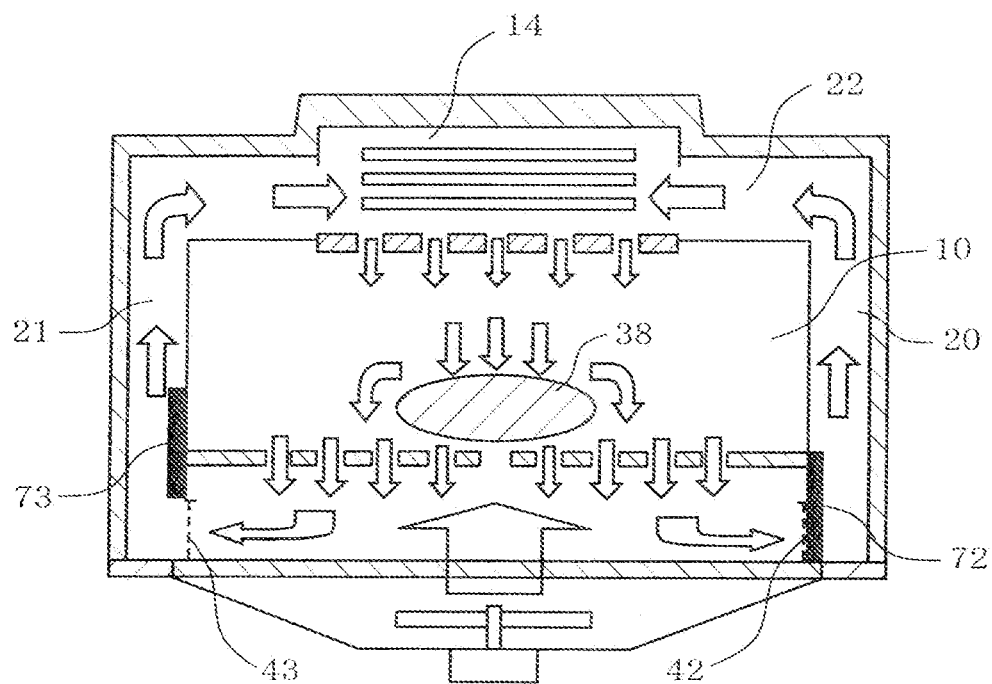
FIGS. 20A and 20B are views explaining hot air flow in the case where shutters are provided at a hot air suction opening so as to be opened and closed alternately.
Figure 20B:
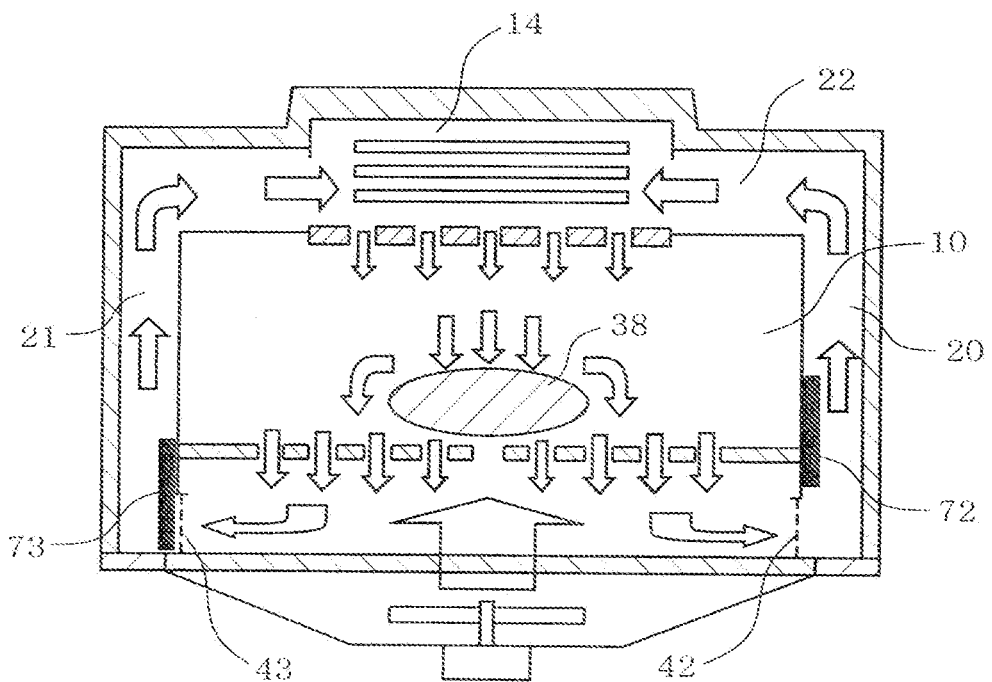

(6) The hot-air suction openings 42 and 43 are provided in the lower parts of the right and left sidewalls of the cooking chamber 10 in the above-described heating cooker 1. However, shutters 72 and 73 may be provided for opening and closing the openings 42 and 43 as shown in FIGS. 20A and 20B. The shutters 72 and 73 are constructed to be driven by an electric motor or the like and may be opened and closed individually by output signals of the control circuit 63. FIG. 20A shows flow of circulation hot air by way of arrows in the case where the shutter 72 of the right hot-air suction opening 42 is closed and the shutter 73 of the left hot-air suction opening 43 is opened. FIG. 20B shows flow of circulation hot air in the case where the closed and opened states of the shutters 72 and 73 are reversed. When the shutters 72 and 73 are automatically opened and closed alternately at predetermined intervals during cooking, the temperature at which the underside of the object 38 is baked can be increased.

Second Embodiment

FIGS. 21 to 33 illustrate a second embodiment of the heating cooker in accordance with the present invention. The second embodiment differs from the first embodiment in that another shelf plate is provided which can further improve the heating efficiency, instead of the shelf 40. Differences of the second embodiment from the first embodiment will primarily be described.

Figure 21:
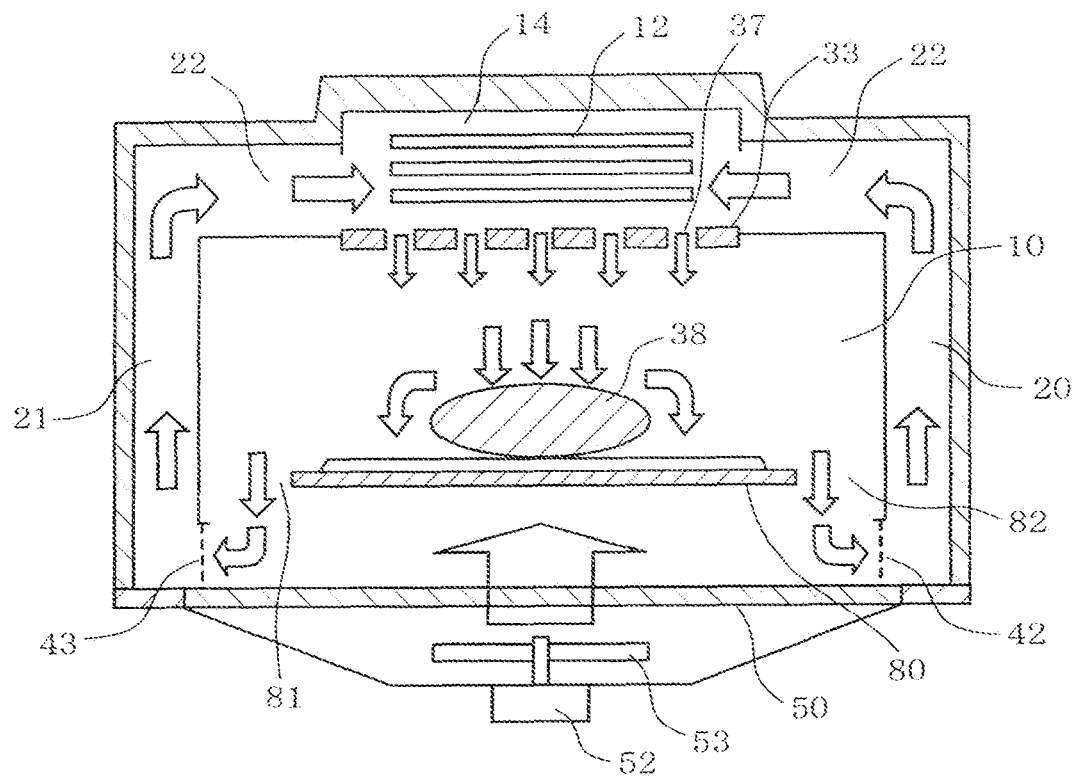
FIG. 21 is a longitudinal front view showing an inner structure of a second embodiment (a view showing a frame format of hot air flow.
Figure 22:
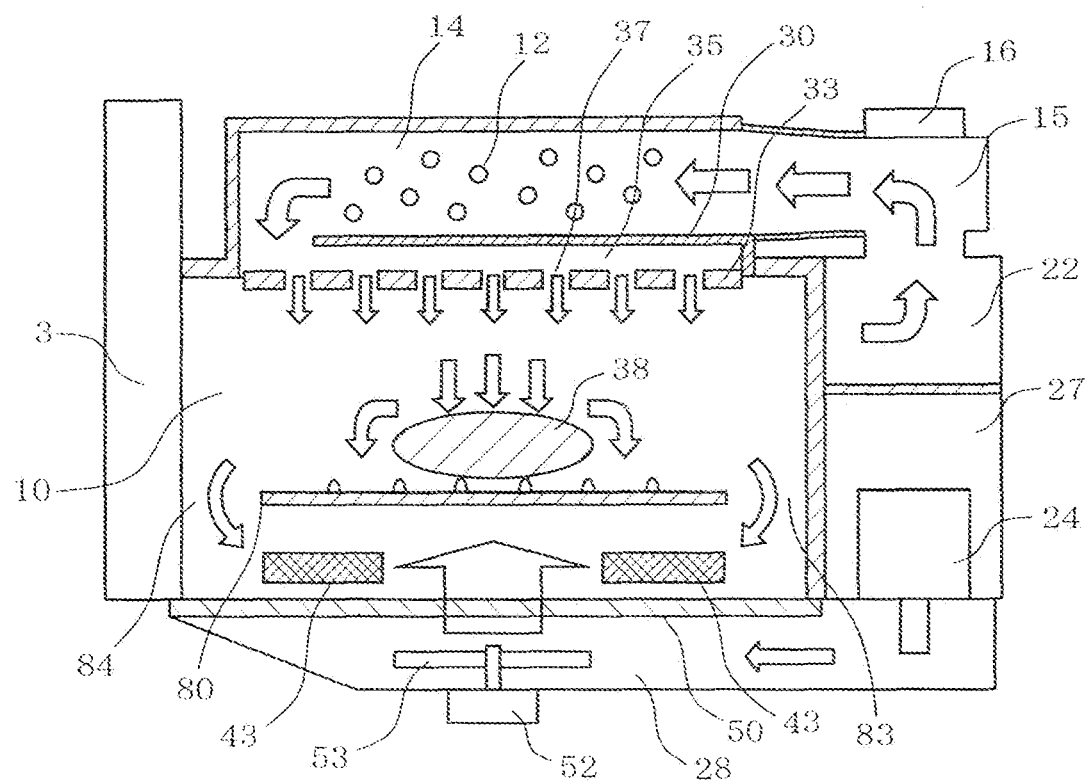
FIG. 22 is a longitudinal front view showing the inner structure of a second embodiment (a view showing a frame format of hot air flow.

FIGS. 21 and 22 schematically show hot air flows in the heating cooker 1. FIG. 21 shows a hot air flow as viewed from the front, and FIG. 22 shows a hot air flow as viewed from the right sidewall. In FIGS. 21 and 22, the shelf plate 80 on which the object 38 to be cooked is placed is provided in the cooking chamber 10. A left opening 81 is defined on the left of the shelf plate 80 and a right opening 82 is defined on the right of the shelf plate 80. Furthermore, a rear opening 83 is defined in the rear of the shelf plate 80 and a front opening 84 is defined in front of the shelf plate 80.

The hot air blown against and impinging on the object 38 spreads around the shelf plate 80 and flows through the openings 81 to 84 into the space under the shelf plate 80. The left hot-air suction opening 43 is provided in a lower part of the left sidewall facing the space under the shelf plate 80, and the right hot-air suction opening 42 is provided in a lower part of the right sidewalls facing the space under the shelf plate 80. Accordingly, the circulation hot air having flowed in the space under the shelf plate 80 further flows through the right and left hot-air suction openings 42 and 43 into the right and left hot air return ducts 20 and 21.

Subsequent flow of circulation hot air is similar to in the first embodiment, that is, the circulation hot air flows upward in the interiors of the right and left hot air return ducts 20 and 21 and further into the hot air return merging duct 22, thereby merging. The merged circulation hot air is drawn into the blower 15. The circulation hot air is also accelerated by the blower 15 again and blown into the heat source box with increased pressure. The above-described flow is repeated thereby to be circulated. In the process, the hot air comes into contact with the heater 12 thereby to obtain heat energy. The heat energy is imparted to the object 38 when impinging on the object 38. As a result, the object 38 is heated from the surface.

Figure 23:
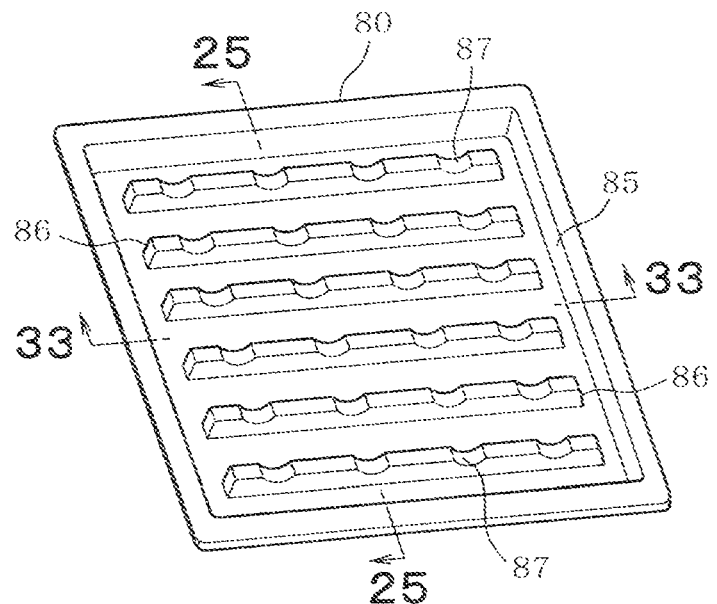
FIG. 23 is a perspective view of the shelf plate as viewed from an upper side thereof.
Figure 24:
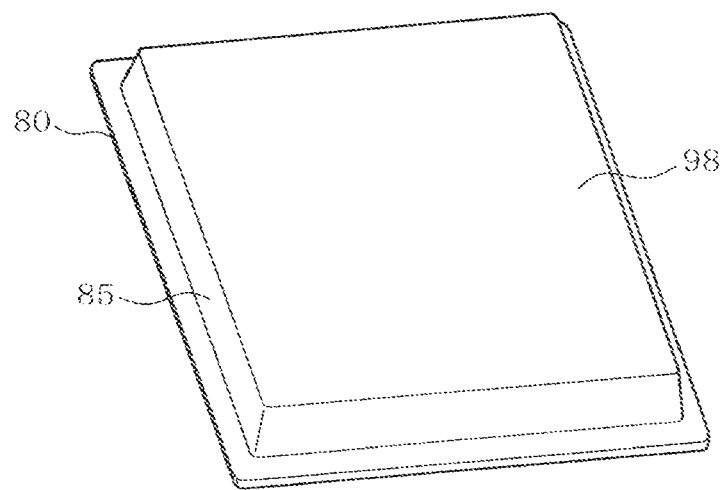
FIG. 24 is a perspective view of the shelf plate as viewed from an under side thereof.

The construction and mounting manner of the shelf plate 80 will now be described. The shelf plate 80 is made of a dielectric material which easily penetrates microwaves since the microwaves irradiated through the bottom 50 onto the shelf plate 80 need to reach the object 38. The shelf plate 80 is formed into the shape of a rectangular shallow dish as shown in FIGS. 23 and 24. FIG. 23 shows an upper side of the shelf plate 80 on which the object 38 is placed. FIG. 24 shows an underside of the shelf plate 80. A rising part 85 is formed along an overall peripheral edge of the upper surface side of the shelf plate 80, whereby the shelf plate 80 is formed into the shallow dish shape.

Convex portions 86 are formed integrally on the bottom of the upper side of the shelf plate 80 on which the object 38 is to be placed. Each convex portion 86 is formed into a convex strip extending in the horizontal direction with respect to the shelf plate 80. A plurality of (six, for example) convex portions 86 are provided. Each convex portion (convex strip) 86 has an upper end (ridge) formed with a plurality of (four in the embodiment) recesses 87. The recesses 87 are formed so as to be aligned in the cross direction.

Figure 25:
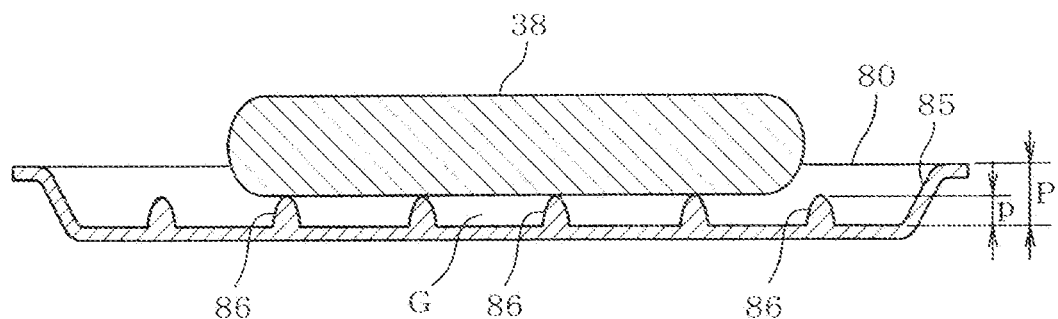
FIG. 25 is a sectional view taken along line 25-25 in FIG. 23 with an object to be cooked being placed on the shelf plate.

FIG. 25 is a sectional view taken along line 25-25 in FIG. 23 with the object 38 to be cooked being placed on the shelf plate 80. The object 38 is supported by the convex portion 86 from below when placed on the convex portion 86. As a result, a gap G is defined between the object 38 and the bottom of the shelf plate 80. The hot air supplied into the cooking chamber 10 flows through the gap G, whereupon the object 38 can be heated directly from below. Furthermore, as shown in FIG.

25, the peripheral rising part 85 has a height P set to be larger than a height p of the convex portions 86.

A part of the shelf plate 80 on which the object 38 is placed has no holes (openings). More specifically, although the part of the shelf plate 80 on which the object 38 is placed is porous, one or two holes may be formed in the part.

Figure 26:
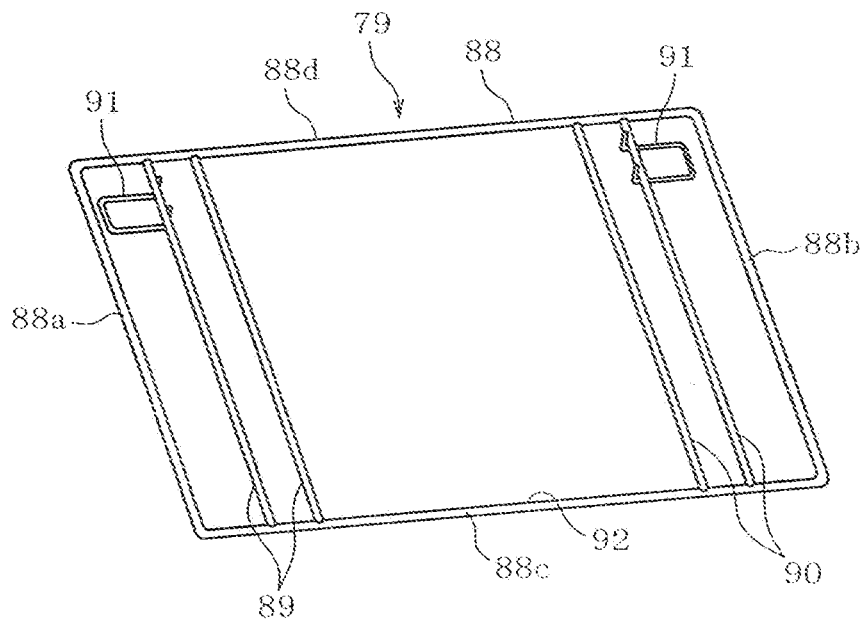
FIG. 26 is a perspective view of a mounting frame.
Figure 27:
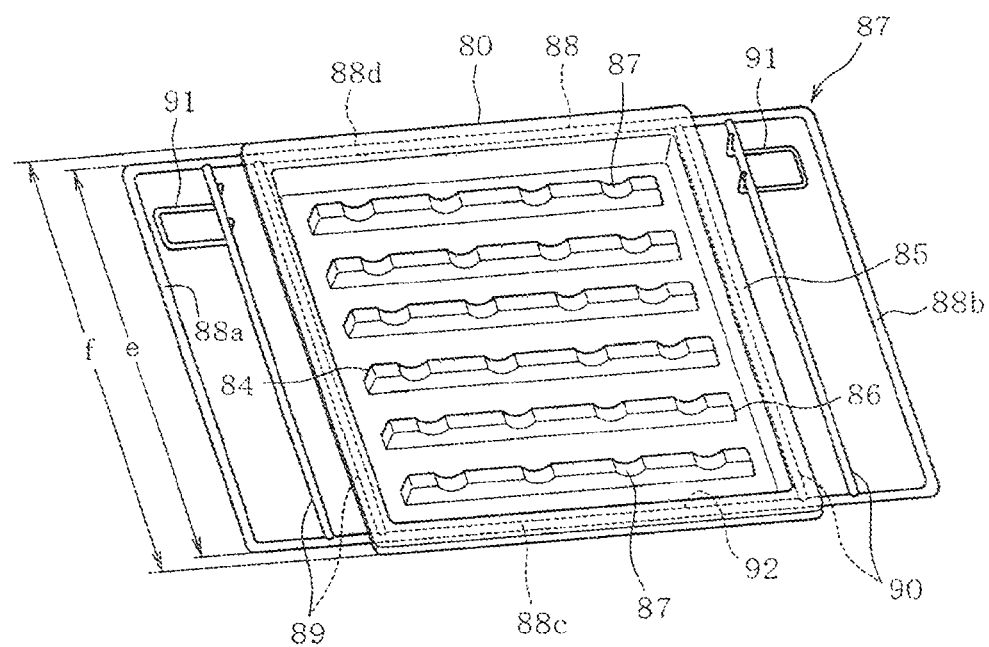
FIG. 27 is a perspective view of the shelf plate and the mounting frame on which the shelf plate is placed.

The shelf plate 80 is mounted on a mounting frame 79 as shown in FIG. 26 and then put into the cooking chamber as shown in FIG. 27. The mounting frame 79 is formed by bending a metal bar which is a heat-resistant material and includes an outer frame 88 formed by welding both ends of the metal bar together. Two left bridging bars 89 and two right bridging bars 90 bridge opposite sides of the outer frame 88. The bridging bars 89 and 90 are disposed so as to be in parallel to and equidistant from the left and right sides 88$a$ and 88$b$. Stoppers 91 which will be described in detail later are attached to the outer bridging bars 89 and 90 respectively.

When the shelf plate 80 is mounted on the mounting frame 87, the underside 98 (see FIG. 24) of the shelf plate 80 is fitted in a rectangular inner frame 92 defined by front and rear sides 88$c$ and 88$d$ of the outer frame 88 and the inner bridging bars 89 and 90, thereby being positioned.

The mounting frame 79 on which the shelf plate 80 is mounted is further mounted in the cooking chamber 10 so as to be movable front and back. A mounting structure for the mounting frame will be described with reference to FIGS. 28 to 31. FIGS. 28 to 31 are schematic views showing the mounting structure for the right sidewall 93 part of the cooking chamber 10. A support plate 94 made of a heat-resistant material is attached to an inside of the right sidewall 93 so as to be located over the right hot-air suction openings 43. An elongate ledge 95 having a rectangular section is horizontally provided on the surface of the support plate 94 facing the interior of the cooking chamber 10. Additionally, the ledge 95 has a front end (end at the door 3 side) which is bent downward substantially at a right angle. The same support plate 94 having the ledge 95 is also mounted on the left sidewall 97 of the cooking chamber 10.

Figure 29:
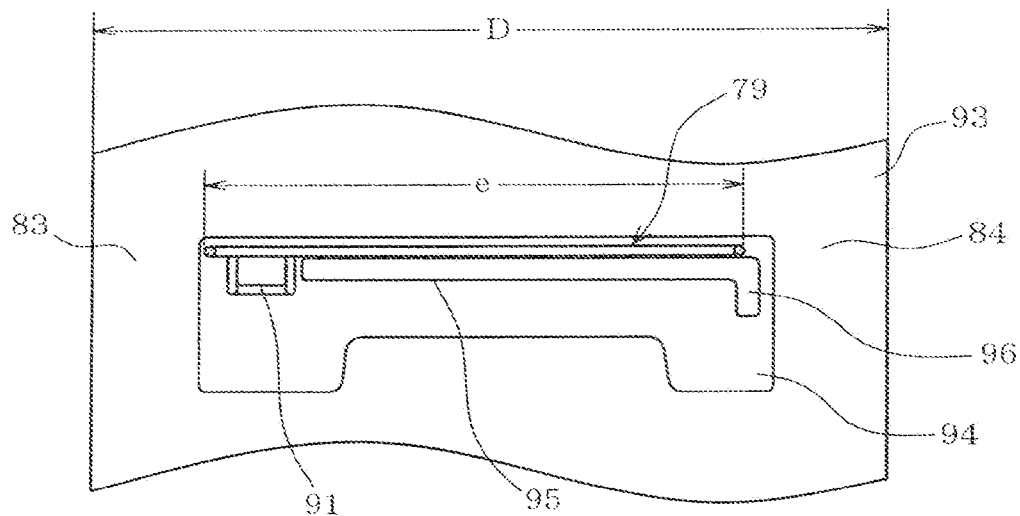
FIG. 29 is a side elevation showing the mounting frame and the side supporting the frame with the mounting frame being in a fitted state.
Figure 30:
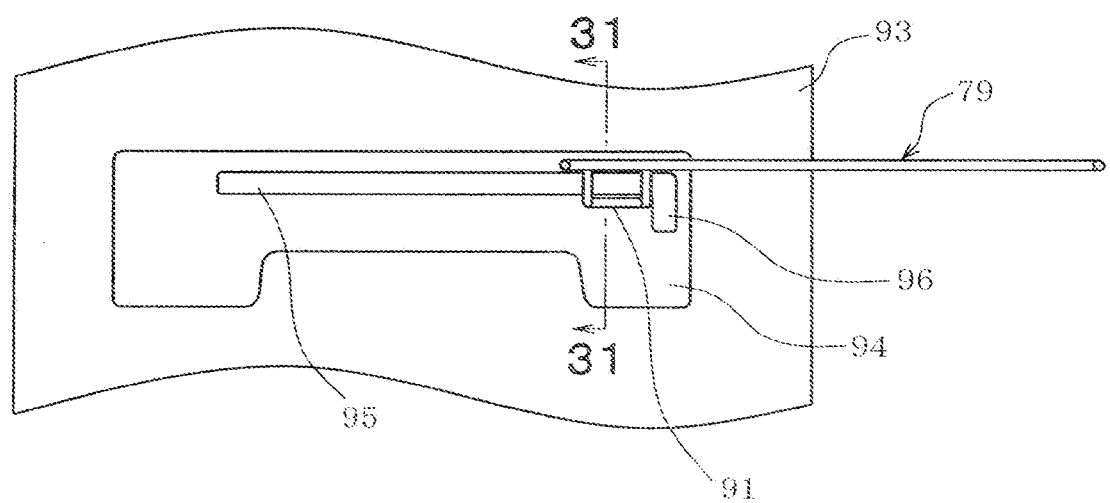
FIG. 30 is a side elevation showing the mounting frame and the side supporting the frame with the mounting frame being in a drawn state.

The mounting frame 79 is put into the cooking chamber 10 thereby to bridge between opposite sidewalls while the left and right sides 88$a$ and 88$b$ of the outer frame 88 are slid on the upper surfaces of the ledges 95 of the support plates 94 of the left and right sidewalls. FIGS. 29 and 30 are side elevations showing the mounting frame 79 accommodated in the cooking chamber 10 as viewed in the direction of the right sidewall 93 at the central side. FIG. 29 shows the mounting frame 79 which is pushed deep such that the left and right sides 88$a$ and 88$b$ of the outer frame 88 are substantially entirely supported on the ledge 95. In heating the object 38, the shelf plate 80 on which the object 38 to be cooked is placed is mounted on the mounting frame 79 in the manner as described above. The mounting frame 79 in this state is pushed into the position as shown in FIG. 29.

Figure 28:
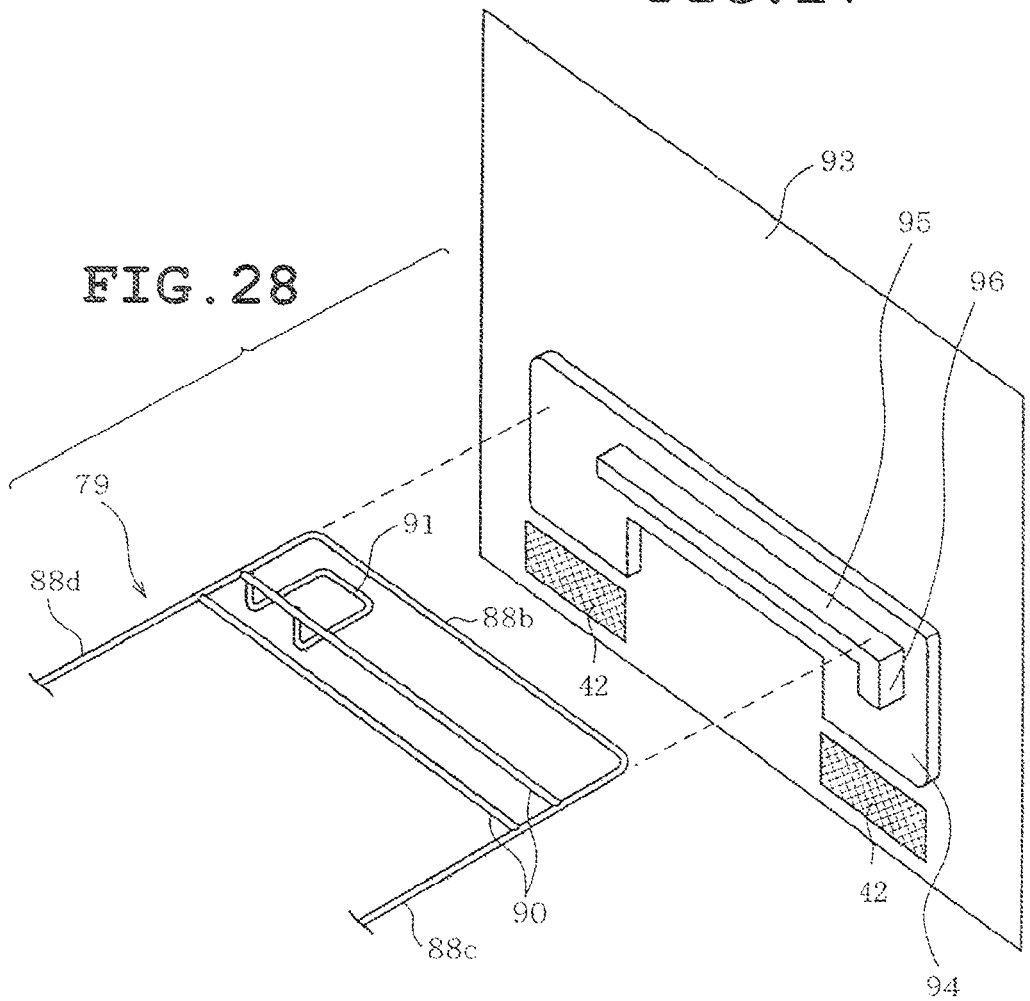
FIG. 28 is a perspective view of the shelf plate and a side supporting the shelf plate.

When the object 38 is placed on and taken out of the shelf plate 80, the mounting frame 79 on which the shelf plate 80 is mounted is drawn frontward. FIG. 30 shows a position relation in the case where the mounting frame 79 is drawn frontward. In order that the mounting frame 79 may be prevented from falling by excessive draw, the stoppers 91 abut against the bent ends 96 thereby to prevent further drawing. Each stopper 91 is formed by bending a metal bar into a rectangular C-shape so as to have an L-shaped configuration as viewed at the front as shown in FIGS. 26 and 28. The stoppers 91 are welded to the lower rear portions of the outer bridging bars 89 and 90 respectively.

Figure 31:
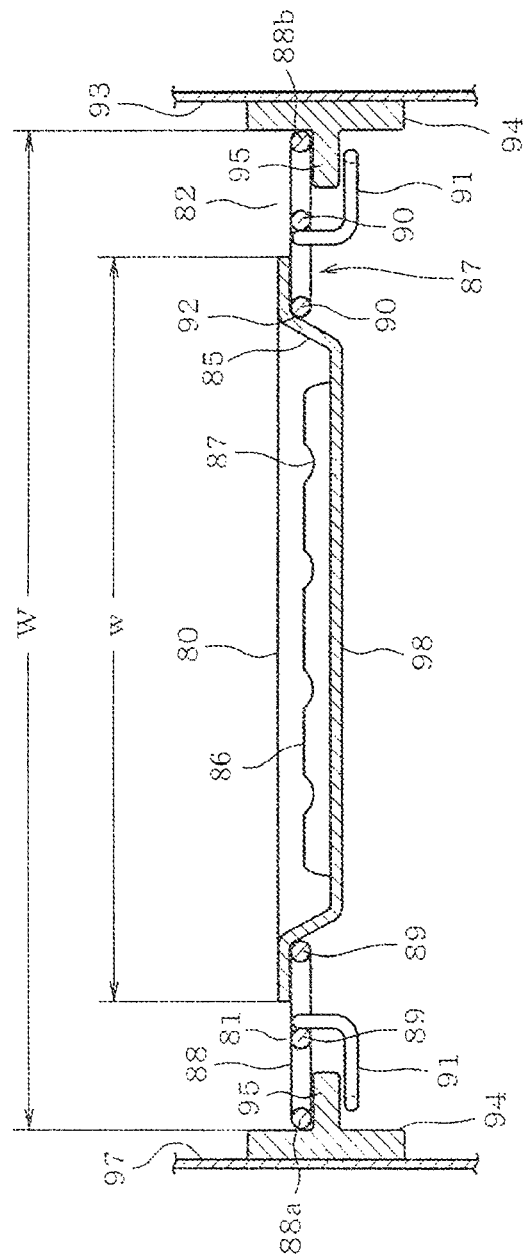
FIG. 31 is a sectional view taken along line 31-31 in FIG. 30, showing the mounting frame on which the shelf plate is placed and both sides supporting the mounting frame.

When the mounting frame 79 is drawn frontward, each ledge 95 is held between the mounting frame 79 and the stopper 91 as shown in FIGS. 30 and 31 that is a sectional view taken along line 31-31 in FIG. 30. Even when the mounting frame 79 is drawn frontward and the center of gravity is shifted from the front end of the ledge 95 such that the mounting frame 79 is to be inclined downward, the ledge 95 remains held between the mounting frame 87 and the stopper 91, thereby preventing the mounting frame 79 from being inclined. Accordingly, the mounting frame 79 remains horizontal even if the front thereof is not supported. Each stopper 91 thus serves both to prevent the mounting frame 79 from falling when the mounting frame is drawn out and to maintain the mounting frame in the horizontal state when the mounting frame has been drawn out.

As obvious from the foregoing and as shown in FIG. 31, the width w of the shelf plate 80 is set to be smaller than the width W of the mounting frame 79. When such a shelf plate 80 is fitted in the inner frame 92 of the mounting frame 79 and put into and set in the cooking chamber 10, gaps are defined between the left and side edges of the shelf plate 80 and the left and right sidewalls 97 and 93 of the cooking chamber 10 respectively. Both gaps form the left and right openings 81 and 82 of the shelf plate 80 respectively.

Furthermore, as shown in FIG. 27, the depth f of the shelf plate 80 is set to be approximately the same as the depth e of the mounting frame 79 and smaller than the depth D of the cooking chamber 10 as shown in FIG. 29. When such a shelf plate 80 is fitted in the inner frame 92 of the mounting frame 79 and put into and set in the cooking chamber 10, gaps are defined between the rear edge of the shelf plate 80 and the inner wall of the cooking chamber 10 and between the front edge of the shelf plate 80 and the front face opening (the inside of the door 3) of the cooking chamber 10. Both gaps form the inner opening 83 of an inner part and the front opening 84 of a front part of the shelf plate 80 respectively.

The heating of the object 38 with the use of the shelf plate 80 will next be described. The object 38 placed on the shelf plate 80 is put into the cooking chamber 10 in the same manner as in the first embodiment. When the cooking operation is started after closure of the door 3, microwaves generated by the magnetron 24 are irradiated uniformly in the cooking chamber 10, and power is supplied to the heater 12 and the blower motor 16 so that circulation hot air is produced.

In this case, the control circuit 63 adjusts the blower motor 16 to a rotational speed according to the name of the object in the same manner as described above. When the temperature of the heater 12 is increased, the circulation air produced by the blower 16 is converted to circulation hot air. The circulation hot air is supplied as jet air through the nozzle holes 37 of the ceiling plate 33 into the cooking chamber 10 thereby to be caused to impinge on the surface of the object 38 so that the object 38 is heated from the surface thereof. The circulation hot air having impinged on the object 38 spreads around the shelf plate 80 and passes through the openings 81 to 84 defined at left and right sides, the rear and front of the shelf plate 80, flowing into the space defined under the shelf plate 80. The circulation hot air is then drawn into the right and left hot-air suction openings 42 and 43. The circulation hot air having passed through the left hot-air return duct 20 and the circulation hot air having passed through the right hot-air return duct 21 merge in the hot-air return merging duct 22. The merged circulation hot air re-enters the blower 15 thereby to be accelerated and then blown against the heat source box 14. The circulation air is heated by the heater 12 into circulation hot air again and re-supplied into the cooking chamber 10.

The following effects are achieved from the second embodiment.

(1) The impinging jet heat transfer technique is employed wherein hot air produced by the hot air generator 18 is caused to impinge on the object 38 as high speed jet flow through the nozzle holes 37 of the ceiling 33 of the cooking chamber 10 so that the object 38 is heated. Consequently, since the heat energy of the hot air is efficiently transferred to the object 38, the object 38 can be cooked in a short period of time.

(2) The openings 83 and 84 through which the aforesaid hot air flows are provided at the rear and front sides of the shelf plate 80. Accordingly, since the hot air blown against the object 38 is circulated without retention, the object 38 can desirably be cooked. In this case, the aforesaid effect can be achieved even when either one of the rear and front openings 83 and 84 is provided, instead.

(3) The shelf plate 80 is placed on the mounting frame 79 which is made of the heat-resistant material and bridges between the left and right sidewalls of the cooking chamber 10. The shelf plate 80 is then put into the cooking chamber 10. Accordingly, when detached for cleaning or other purposes, the shelf plate 80 is detached from the mounting frame 79 without detaching from the support plates 94 supporting the mounting frame 79 so that the frame bridges between the sidewalls of the cooking chamber 10. Consequently, the shelf plate 80 can easily be detached.

(4) Differing from the shelf plate 40 with the holes 41 in the first embodiment, the shelf plate 80 is provided with the convex portions 86 formed on the side thereof on which the object 38 is placed. The object 38 is supported by the convex portions 86 from below, whereupon the gaps G are defined between the object 38 and the bottom of the shelf plate 80 as shown in FIG. 25. Consequently, the hot air can be caused to flow through the gaps G. The hot air can be supplied to the bottom side even when the object 38 is not placed directly on the bottom of the shelf plate 80. As a result, the object 38 can desirably be cooked.

(5) The convex portions 86 of the shelf plate 80 are formed into the plural convex strips extending in the horizontal direction with respect to the cooking chamber 10. Accordingly, the hot air enters the gaps G defined by the convex portions 86 between the object 38 and the side of the shelf plate 80 on which the object 38 is placed. The hot air is then guided by the convex portions (convex strips) 86 thereby to flow smoothly in the horizontal direction with respect to the cooking chamber 10. Since the hot air also flows smoothly through the left and right openings 81 and 82 of the cooking chamber 10 below the shelf plate 80, turbulence of hot air can be prevented. In particular, when the right and left hot-air suction openings 42 and 43 are formed in the right and left sidewalls of the cooking chamber 10 as in the embodiment, the hot air can be guided into the right and left hot-air suction openings 42 and 43, whereupon the turbulence of hot air can further be prevented.

(6) The rising portion 85 is provided along the peripheral edge of the shelf plate 80 so that the shelf plate is formed into the shallow dish shape. Consequently, the hot air enters the gaps G defined by the convex portions 86 between the object 38 and the side of the shelf plate 80 on which the object 38 is placed. The hot air is blocked by the rising portion 85 thereby to remain temporarily, whereupon the underside of the object 38 can reliably be heated. Furthermore, since water, meat juice or the like also remains on the shelf plate 80, the water, meat juice or the like can be prevented from falling onto the bottom of the cooking chamber 10 thereby soiling the bottom.

(7) In the above-described case, the height P of the rising portion 85 is set to be larger than the height p of each convex portion 86. Consequently, the hot air having entered the gaps G can further reliably remain temporarily and the underside of the object 38 can be heated further reliably.

Figure 32:
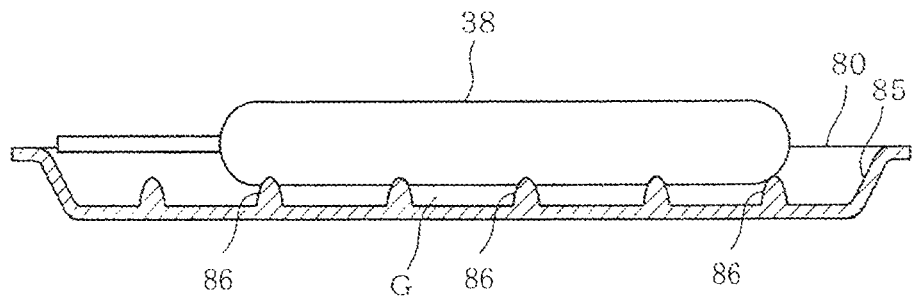
FIG. 32 is a sectional view taken along line 25-25 in FIG. 23, showing a shelf plate on which an object to be cooked differing from that in FIG. 25.
Figure 33:
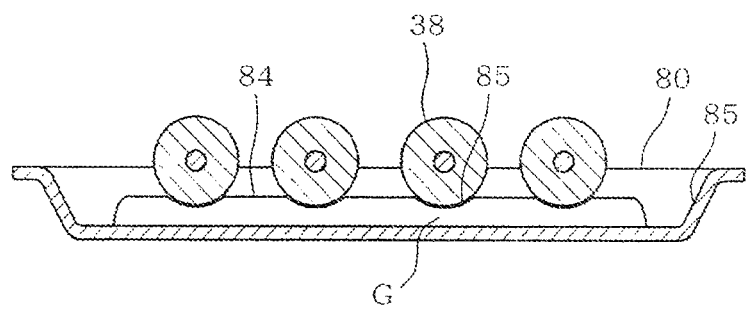
FIG. 33 is a sectional view taken along line 33-33 in FIG. 23, showing a shelf plate on which an object to be cooked differing from that in FIG. 25.

(8) The recesses 87 are provided in the upper end of each convex portion 86 of the shelf plate 80. It can be considered that without the recesses 87, a circular object 38 such as frankfurter or corn dog would roll thereby to fall off from the shelf plate 80 when subjected to wind blast of the hot air supplied into the cooking chamber 10 as shown in FIG. 32 (a sectional view taken along line 25-25 in FIG. 23) and FIG. 33 (a sectional view taken along line 33-33 in FIG. 23). However, the cylindrical object 38 is engaged with the recesses 87 thereby to be prevented from rolling, whereupon the object 38 can be prevented from falling off from the shelf plate 80. Consequently, the object 38 can be cooked desirably without escaping from the hot air supplied into the cooking chamber 10.

Additionally, convex portions may be provided on the upper end of each convex portion 86, instead of the recesses 87. In this case, too, the object 38 can be prevented from rolling and falling off from the shelf plate 80.

Third Embodiment

Figure 34:
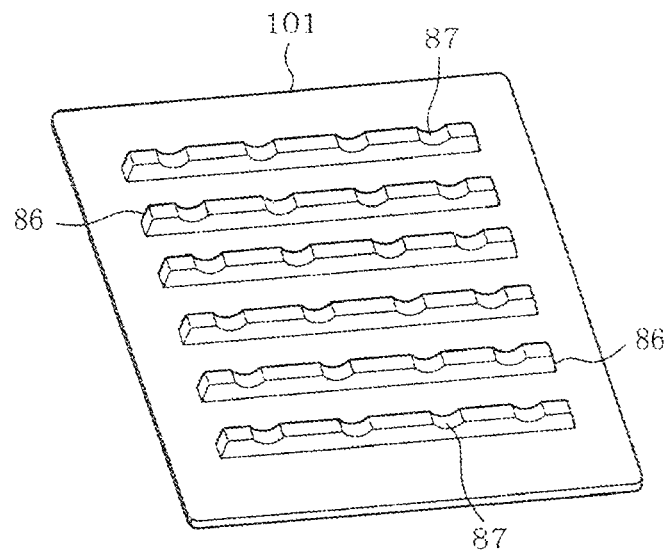
FIG. 34 is a view similar to FIG. 23, showing a third embodiment of the invention.
Figure 35:
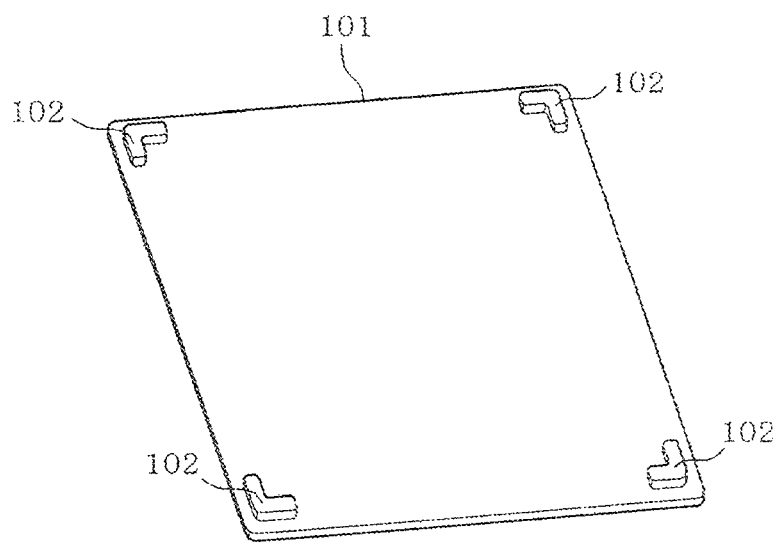
FIG. 35 is a view similar to FIG. 24.

FIGS. 34 and 35 illustrate a third embodiment of the invention. Differences of the third embodiment from the second embodiment will be described in the following. In the third embodiment, a flat shelf plate 101 is used instead of the above-described shallow dish-shaped shelf plate 80. FIG. 34 shows the surface of the shelf plate 101 and FIG. 35 shows the underside of the shelf plate 101. The aforesaid convex portions 86 are provided on the surface of the shelf plate 101. The recess 87 is formed in the upper end of each convex portion 86. Generally L-shaped convex portions 102 are formed on four corners of the underside of the shelf plate 101. The convex portions 102 correspond to corners of the underside of the shelf plate 80. The convex portions 102 are fitted in the inner frame 92 of the mounting frame 79 so that the shelf plate 101 is positioned. Consequently, the third embodiment can achieve the same effect as the second embodiment.

Fourth Embodiment

Figure 36:
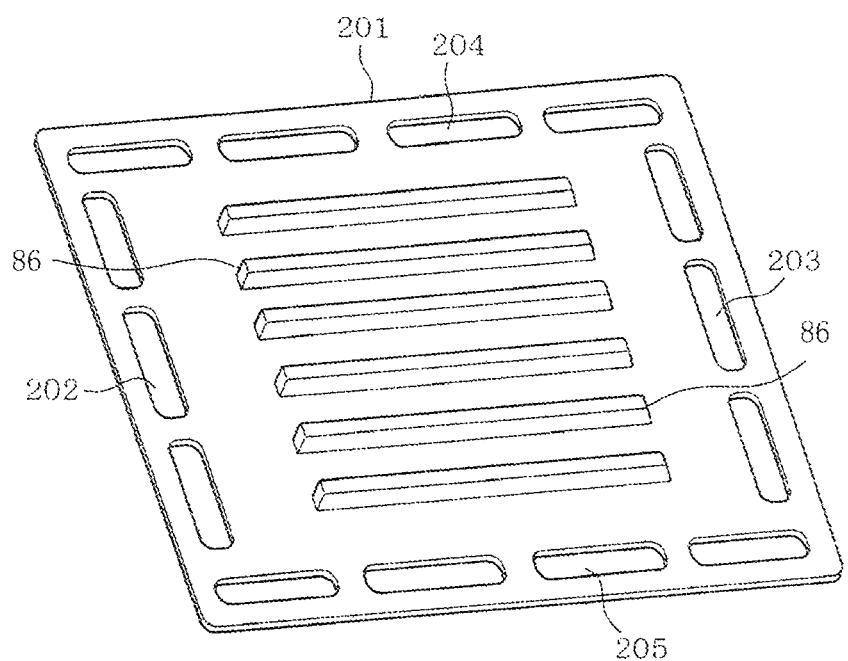
FIG. 36 is a view similar to FIG. 23, showing a fourth embodiment of the invention.

FIG. 36 illustrates a fourth embodiment of the invention. The difference of the fourth embodiment from the second embodiment is the use of a flat shelf plate 201, instead of the shallow dish-shaped shelf plate 80. FIG. 36 shows a surface of the shelf plate 201. Although the surface of the shelf plate 201 is formed with the aforesaid convex portions 86, no recesses 87 are formed in the upper ends of the convex portions 86. The recesses 87 may or may not be provided. Generally L-shaped convex portions similar to those in the third embodiment (see FIG. 35) are formed in the underside of the shelf plate 201 though not shown. The shelf plate 201 is bored in the right and left sides, the rear and the front thereof, whereby openings 202 to 205 are formed in the portions of the shelf plate 201 corresponding to the left and right sides, the rear and the front of the shelf plate 80 in the second embodiment, instead of the openings 81 to 84. The fourth embodiment can achieve the same effect as the second embodiment.

The invention claimed is:
1. A heating cooker of hot air circulation type comprising:
 a box-shaped cooking chamber adapted to accommodate an object to be cooked;
 a hot air generator having a heater-type heat source and a blower; and a shelf plate comprised of a heat-resistant material and provided in the cooking chamber so that the object is to be placed thereon, the shelf plate having openings next to both right and left sides of the shelf plate; wherein hot air generated by the hot air generator impinges on the object placed on the shelf plate as a high-speed jet through a nozzle hole provided in a ceiling of the cooking chamber so that heat is applied to the object;

the hot air which has flowed through the nozzle hole and impinged on the object is drawn out through hot-air suction openings provided in lower parts of right and left side walls of the cooking chamber by the blower, whereby the hot air is returned to the hot air generator to be recirculated;

the shelf plate has a convex portion formed on a face on which the object is to be placed and which is adapted to support the object from below; and the heater-type heat source constituting the hot air generator includes a plurality of U-shaped heaters each of which has radiating fins therearound, the U-shaped heaters being disposed at equal intervals in a direction of flow of air blown by the blower and locations of each odd-numbered heater and even-numbered heater are displaced by an outer diameter of the radiating fin in a direction perpendicular to the direction of the air flow so that the heaters are inclined at such an angle that peripheries of the radiating fins of the heaters adjacent to each other are seen as overlapped.

2. The heating cooker according to claim 1, further comprising hot air returning ducts provided outside the right and left sidewalls in common use of a sidewall of the cooking chamber respectively, the hot air returning ducts returning the hot air drawn out through the hot-air suction openings to the hot air generator.

3. The heating cooker according to claim 1, wherein the ceiling plate has a plurality of the nozzle holes and a space is set between the nozzle holes and the object is set so that high-speed jet flows from two nozzle holes are coupled together near a surface of the object so as to be regarded as a jet flow from a single nozzle hole.

4. The heating cooker according to claim 1, wherein the shelf plate is made of a metal material.

5. The heating cooker according to claim 1, wherein a part or whole of a bottom plate of the cooking chamber is composed of a dielectric partition plate, and microwave energy is irradiated from below through the partition plate into the cooking chamber.

6. The heating cooker according to claim 5, wherein:
a plurality of the nozzle holes are provided in the ceiling of the cooking chamber;
each nozzle hole has a circular or polygonal shape and fits within a circle having a diameter which is one sixth of a wavelength of the microwave; and
the nozzle holes are arranged so as to be spaced from each other by a center-to-center distance equal to or larger than two sixths of the wavelength of the microwave.

7. The heating cooker according to claim 5, wherein shutters are mounted to the hot-air suction openings provided in the lower portions of the right and left sidewalls of the cooking chamber for opening and closing the hot-air suction openings respectively, and means are provided for controlling the shutters individually so that the shutters are opened and closed.

* * * * *